US012534327B2

(12) United States Patent
Schwartz et al.

(10) Patent No.: US 12,534,327 B2
(45) Date of Patent: Jan. 27, 2026

(54) TRANSFER PUCK WITH COMPRESSIBLE SURFACE MEMBER

(71) Applicant: Curt G. Joa, Inc., Sheboygan Falls, WI (US)

(72) Inventors: Christopher A. Schwartz, Howards Grove, WI (US); Darren R. Horness, Sheboygan, WI (US); Jeffrey W. Fritz, Plymouth, WI (US); Zachary J. Giffey, Plymouth, WI (US); Megan A. Rammer, Sheboygan, WI (US)

(73) Assignee: Curt G. Joa, Inc., Sheboygan Falls, WI (US)

( * ) Notice: Subject to any disclaimer, the term of this patent is extended or adjusted under 35 U.S.C. 154(b) by 16 days.

(21) Appl. No.: 18/716,770

(22) PCT Filed: Dec. 8, 2022

(86) PCT No.: PCT/US2022/081155
§ 371 (c)(1),
(2) Date: Jun. 5, 2024

(87) PCT Pub. No.: WO2023/108052
PCT Pub. Date: Jun. 15, 2023

(65) Prior Publication Data
US 2025/0051125 A1    Feb. 13, 2025

Related U.S. Application Data

(60) Provisional application No. 63/265,124, filed on Dec. 8, 2021.

(51) Int. Cl.
*B65H 29/24* (2006.01)
*B65H 39/14* (2006.01)

(52) U.S. Cl.
CPC .......... *B65H 29/241* (2013.01); *B65H 39/14* (2013.01); *B65H 2402/10* (2013.01);
(Continued)

(58) Field of Classification Search
CPC ............ B65H 29/241; B65H 2406/343; B65H 2801/57; B65H 2406/345; B65H 2406/3454
See application file for complete search history.

(56) References Cited

U.S. PATENT DOCUMENTS 9,168,642 B2     10/2015   Cho
9,266,314 B2 *    2/2016   Findley ................ B65G 47/848
(Continued)

FOREIGN PATENT DOCUMENTS

DE    202005005023 U1    8/2006
DE    102019219745 A1    6/2021
(Continued)

OTHER PUBLICATIONS

International Search Report and Written Opinion for corresponding PCT Application No. PCT/US2022/081155, mailed May 10, 2023.

*Primary Examiner* — Jeremy R Severson
(74) *Attorney, Agent, or Firm* — Quarles & Brady, LLP

(57) ABSTRACT

An apparatus includes a transfer mechanism that transfers discrete articles to a receiving member. The transfer mechanism includes a plurality of transfer pucks that carry discrete articles thereon. Each of the transfer pucks includes a puck body with an article carrying surface having vacuum holes formed therein to retain the discrete article thereon via a vacuum. The article carrying surface includes a central region and at least one side region adjacent the central region, the side region aligned lengthwise along the puck body. Each of the transfer pucks also includes one or more resilient puck inserts positioned about a portion of a perim- (Continued)

eter of the transfer puck, with each puck insert engaged with the puck body in a respective side region. The puck inserts are sized to protrude above the article carrying surface and are depressible inward toward the article carrying surface upon an application of force thereto.

24 Claims, 15 Drawing Sheets

(52) U.S. Cl.
CPC .. *B65H 2406/343* (2013.01); *B65H 2406/345* (2013.01); *B65H 2406/3454* (2013.01); *B65H 2801/57* (2013.01)

(56) References Cited

U.S. PATENT DOCUMENTS

| | | | |
|---|---|---|---|
| 9,573,280 | B2 | 2/2017 | Harter |
| 9,957,116 | B2 | 5/2018 | Staunton et al. |
| 10,479,609 | B2 | 11/2019 | Peebles et al. |
| 2003/0121614 | A1 | 7/2003 | Tabor et al. |
| 2017/0151097 | A1 | 6/2017 | Schneider et al. |
| 2021/0101763 | A1 | 4/2021 | Tordini et al. |
| 2021/0253369 | A1 | 8/2021 | Spurzem |

FOREIGN PATENT DOCUMENTS

| | | | | |
|---|---|---|---|---|
| EP | 1931581 | B1 | 8/2009 | |
| EP | 1820757 | B1 | 11/2013 | |
| EP | 2659869 | A1 * | 11/2013 | ....... A61F 13/15764 |
| EP | 2084067 | B1 | 2/2015 | |
| EP | 2865619 | B1 | 12/2015 | |
| EP | 3431423 | B1 | 7/2021 | |
| EP | 3973935 | A1 | 3/2024 | |
| WO | 2021143964 | A1 | 7/2021 | |

\* cited by examiner

TRANSFER PUCK WITH COMPRESSIBLE SURFACE MEMBER

CROSS REFERENCE TO RELATED APPLICATION

This application is the U.S. National Stage of PCT/US2022/081155 with international filing date of Dec. 8, 2022, and which claims priority to U.S. Provisional Application No. 63/265,124 filed on Dec. 8, 2021, the contents of which are incorporated by reference in their entireties.

BACKGROUND OF THE INVENTION

Embodiments of the invention relate to an apparatus for transferring discrete components or articles as they advance along a production line. More particularly, embodiments of the invention relate to a transfer puck employed on such an apparatus that includes a compressible or flexible surface member that aids in transferring the discrete component off from the transfer puck.

In the production and manufacture of various products, it frequently is necessary to manufacture one component of the product and then transfer that component to another location for use in another step in the production process. For the example of a disposable absorbent product such as a diaper, a discrete component such as an absorbent core or insert may be manufactured at a first location and then transferred to a second location and onto a receiving surface that may comprise one or more moving webs of components, such as webs of front and rear belt portions for example.

The above-described transfer of a discrete component is accomplished with a transfer apparatus that employs pucks, which retain the discrete component and perform a controlled transfer between a pickup position and a dropoff position, where the puck aids in proper application and joining of the discrete component onto a receiving surface. Typical transfer apparatuses function to receive or form a discrete component at a receiving location and transfer the component for placement onto a receiving surface at a placement location. Additionally, the apparatus may also function to spin the component to a predetermined angle and/or control a velocity and pitch between components to achieve a desired placement pitch on the receiving surface.

The transfer apparatus may include a large wheel (a "puck wheel") having a plurality of rotating pucks secured thereto that are selectively operable to provide the transferring and optional spinning and re-pitching of the discrete components. The puck wheel is driven and supported by a shaft extending from the drive side of the apparatus, with the transfer pucks in turn being rotated along with the wheel. Additionally, each of the transfer pucks functions to spin/turn about its own spin axis, so as to provide for turning (e.g., 90-degree turn) of the discrete articles. In operation, a discrete component is received by a transfer puck at a receiving location, with the transfer puck securing the component thereto via a vacuum as the transfer puck is rotated along with the puck wheel (and spun about the spin axis) from the receiving location to a placement location. At the receiving location, the vacuum at the transfer puck can be deactivated to release the discrete component onto a receiving surface.

The above-described operation of the transfer apparatus, where a vacuum is selectively activated and deactivated to retain a discrete component on a transfer puck and then release the discrete component from the transfer puck and onto a receiving surface, is known to be effective for the transfer of many components, including for transfer of an absorbent pad used in disposable products. However, it is recognized that, for some components, the characteristics of the component may inhibit the ability of the transfer puck to adequately release and transfer the component onto a receiving surface via the deactivation of the vacuum at the puck surface. That is, for components having an increased size, thickness, and/or material density, for example, the component may not release from the transfer puck as easily as components with a lower size, thickness, or material density—this due (at least in part) to a deactivation of the vacuum or a reversal of air flow through the puck surface (i.e., a blow off) not having as dramatic an effect in separating the component from the puck surface. While the discrete component can more forcibly be transferred onto the receiving surface at the placement location, such as by applying a force and pushing the transfer puck and component down onto the receiving surface, such application of force could damage the component or the receiving surface (e.g., receiving web) due to the rigid structure of the transfer puck.

Therefore, it is desirable to provide a transfer puck and overall transfer apparatus that provides for the efficient transfer of a wide range of discrete components onto a receiving surface, so as to accommodate the transferring of discrete articles of differing types and sizes. The transfer puck would ensure that the discrete component is transferred accurately onto the receiving surface and done so without damaging the discrete component or the receiving surface even when force is applied during application and transfer of the discrete component.

BRIEF DESCRIPTION OF THE INVENTION

Embodiments of the invention are expressed and characterized in the independent claims, while the dependent claims explain other characteristics and variants of the invention. The characteristics and variants described in the dependent claims may be used in combination with or in isolation from each other, according to embodiments of the invention.

In accordance with some embodiments, an apparatus includes a transfer mechanism configured to transfer a plurality of discrete articles from an article receiving location to an article placement location, the transfer mechanism including a plurality of transfer units that move along a transfer path from the article receiving location to the article placement location, each of the plurality of transfer units including a transfer puck that is selectively operable to carry a discrete article thereon as the transfer puck travels between the article receiving location and the article placement location. The apparatus also includes a receiving member positioned at the article placement location to receive the plurality of discrete articles from the transfer mechanism. Each of the transfer pucks includes a puck body with a back surface and an article carrying surface having vacuum holes formed therein to retain the discrete article thereon via a vacuum, the article carrying surface including a central region and at least one side region adjacent the central region, the at least one side region aligned lengthwise along the puck body. Each of the transfer pucks also includes a puck insert arrangement comprising one or more puck inserts positioned about a portion of a perimeter of the transfer puck, with each of the one or more puck inserts engaged with the puck body in a respective side region and sized to protrude above the article carrying surface. Each of the one or more puck inserts is a resilient structure that is depressible inward toward the article carrying surface upon an application of force thereto.

In some embodiments, the puck insert arrangement comprises a pair of puck inserts.

In some embodiments, the at least one side region comprises a pair of side regions on opposing sides of the central region and the puck body comprises an insert channel formed in each side region of the pair of side regions, with a puck insert of the one or more puck inserts slidingly engaging each respective insert channel.

In some embodiments, that apparatus includes an end cap secured to at least one end of the puck body, the end cap closing off the insert channel to secure the puck insert within the insert channel.

In some embodiments, the puck body comprises one or more vacuum channels formed therein to provide a fluid flow path for a vacuum from the back surface to the vacuum holes of the article carrying surface and each of the one or more puck inserts comprises a hollow member that defines an interior chamber, the interior chamber in fluid communication with the vacuum channels of the puck body.

In some embodiments, each of the one or more puck inserts comprises a top wall including the vacuum holes formed therein, a bottom wall including one or more openings formed therein, and a pair of side walls positioned between the top wall and the bottom wall to space the top wall from the bottom wall, wherein the top wall, the bottom wall, and the pair of side walls define the interior chamber and a vacuum is communicated from the vacuum channels of the puck body, through the openings in the bottom wall, and through the interior chamber, to the vacuum holes in the top wall.

In some embodiments, each of the one or more puck inserts comprises a trapezoid-shaped member where the pair of side walls are parallel.

In some embodiments, for each of the one or more puck inserts, the top wall is angled from a higher edge positioned adjacent the central region down to a lower edge positioned adjacent a lengthwise edge of the puck body.

In some embodiments, each of the one or more puck inserts comprises a bellows-shaped member that flexes and depresses inward upon an application of force thereto.

In some embodiments, each of the one or more puck inserts is composed of rubber, silicone rubber, polyurethane, a thermoplastic polyurethane (TPU), a thermoplastic elastomer (TPE), or neoprene foam.

In some embodiments, the transfer mechanism is configured to bring each of the plurality of transfer units into forcible contact with the receiving member at the article placement location to transfer the plurality of discrete articles onto the receiving member, with the forcible contact causing the resilient structure to depress inward toward the article carrying surface.

In some embodiments, the puck insert arrangement comprises a single puck insert positioned on a leading edge of the transfer puck that first comes into contact with the receiving member at the article placement location.

In accordance with other embodiments, a transfer puck for transferring and placing a discrete article onto a receiving surface is provided. The transfer puck includes a puck body with a back surface and an article carrying surface having vacuum holes formed therein to retain the discrete article thereon via a vacuum, the article carrying surface including a central region and at least one side region adjacent the central region, the at least one side region aligned lengthwise along the puck body. The transfer puck also includes a puck insert arrangement including one or more puck inserts positioned about a portion of a perimeter of the transfer puck, with each of the one or more puck inserts engaged with the puck body in a respective side region to protrude above the article carrying surface. Each of the one or more puck inserts is a resilient structure that is depressible inward toward the article carrying surface upon an application of force thereto.

In some embodiments, the at least one side region comprises a pair of side regions positioned on opposing sides of the central region and the puck body comprises an insert channel formed each respective side region of the pair of side regions, with each puck insert of the one or more puck inserts slidingly engaging a respective insert channel.

In some embodiments, the puck insert arrangement comprises a pair of puck inserts, with each puck insert of the pair of puck inserts engaged with a respective insert channel.

In some embodiments, the puck body comprises one or more vacuum channels formed therein to provide a fluid flow path for a vacuum from the back surface to the vacuum holes of the article carrying surface and each of the one or more puck inserts comprises a hollow member that defines an interior chamber, the interior chamber in fluid communication with the vacuum channels of the puck body.

In some embodiments, each of the one or more puck inserts comprises a top wall including the vacuum holes formed therein, a bottom wall including one or more openings formed therein, and a pair of side walls positioned between the top wall and the bottom wall to space the top wall from the bottom wall, wherein the top wall, the bottom wall, and the pair of side walls define the interior chamber and a vacuum is communicated from the vacuum channels of the puck body, through the openings in the bottom wall, and through the interior chamber, to the vacuum holes in the top wall.

In some embodiments, for each of the one or more puck inserts, the top wall is angled from a higher edge positioned adjacent the central region down to a lower edge positioned adjacent a lengthwise edge of the puck body.

In some embodiments, each of the one or more puck inserts comprises a bellows-shaped member that flexes and depresses inwardly upon an application of force thereto.

In some embodiments, the central region comprises a recessed region, with the side regions and each of the one or more puck inserts protruding above the recessed region.

In accordance with yet other embodiments, a method of transferring a discrete article from a transfer puck to a receiving surface is provided. The method includes retaining the discrete article on an article carrying surface of the transfer puck via a vacuum communicated through the transfer puck, the transfer puck including one or more puck inserts affixed to the article carrying surface at one or more side regions thereof so as to be positioned about a portion of a perimeter of the transfer puck, with each of the one or more puck inserts protruding above the article carrying surface and comprising a resilient structure that is depressible inward toward the article carrying surface upon an application of force thereto. The method also includes transferring the discrete article off of the transfer puck and onto the receiving surface at an article placement location, wherein transferring the discrete article includes bringing the discrete article retained on the article carrying surface into contact with the receiving surface at the article placement location and applying a pushing force from the transfer puck onto the receiving surface as the discrete article is brought into contact with the article carrying surface to transfer the discrete article from the article carrying surface onto the receiving surface. The pushing force causes the one or more puck inserts to depress inwardly toward the article carrying surface.

In some embodiments, the pushing force depresses a puck insert of the one or more puck inserts positioned at a leading edge of the transfer puck that first comes into contact with the receiving surface at the article placement location.

In some embodiments, the pushing force depresses a puck insert of the one or more puck inserts positioned at a trailing edge of the transfer puck opposite the leading edge.

In some embodiments, the vacuum communicated through the transfer puck is communicated through vacuum holes formed in the article carrying surface and the one or more puck inserts.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Embodiments of the invention are directed to a compressible transfer puck for use with a cutting and transfer apparatus or pick-and-place system for facilitating the transfer of discrete articles. Although the disclosure hereof is provided in sufficient detail to enable those skilled in the art to practice the invention, the physical embodiments herein disclosed merely exemplify the invention, which may be embodied in other specific structures. While the preferred embodiments have been described, the details may be changed without departing from the invention.

Figure 1:
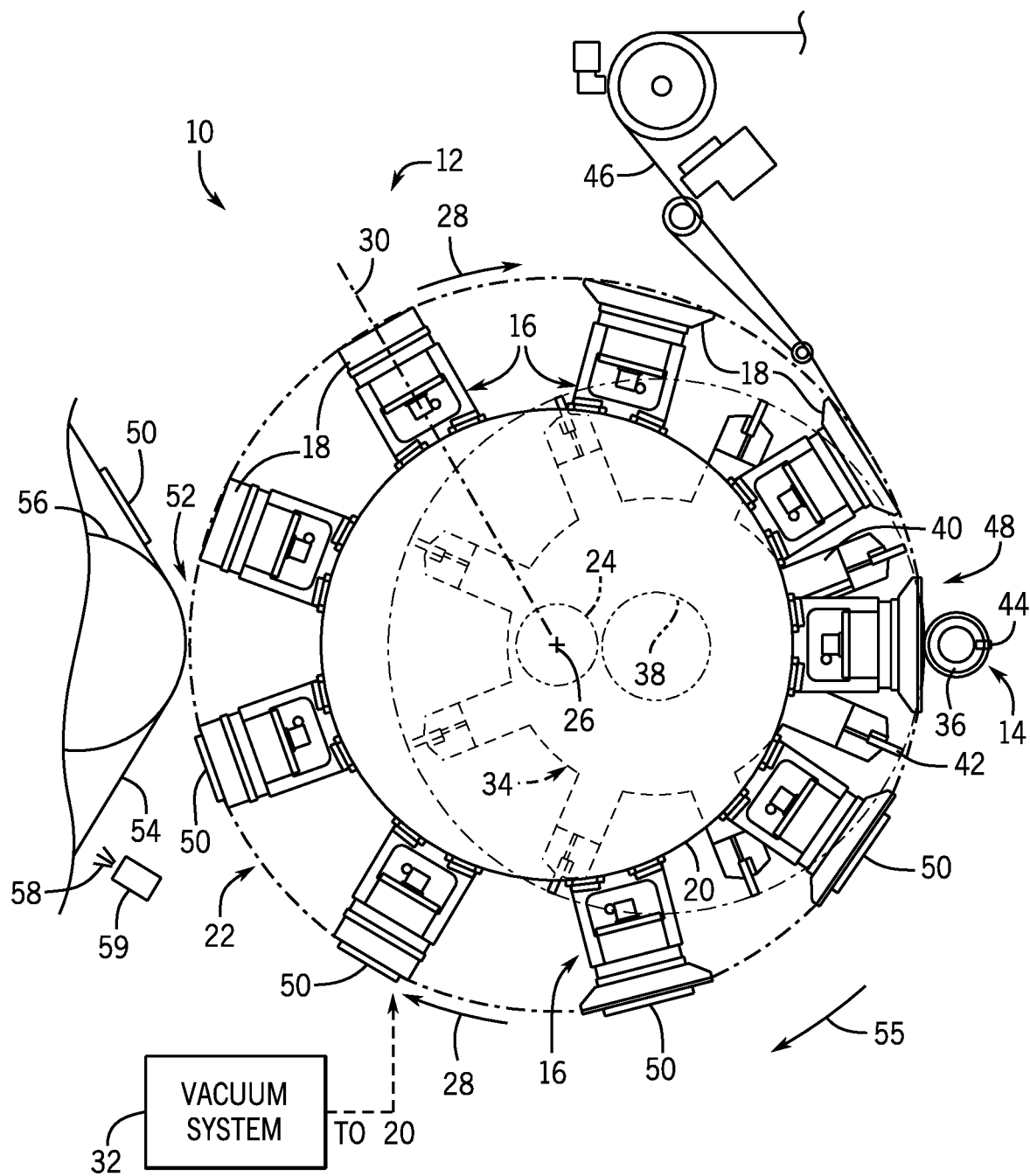
FIG. 1 is a front elevational view of a cutting and transfer apparatus in which embodiments of the invention may be implemented, according to an embodiment of the invention.

Referring to FIG. 1, a cutting and transfer apparatus 10 (or "apparatus 10") is shown with which embodiments of the invention may be implemented. The apparatus 10 preferably includes a transfer mechanism 12 and a cutting system 14. The transfer mechanism 12 includes a plurality of transfer units 16 each including a transfer pad or puck 18 (referred to hereafter as "transfer puck 18") that may be engaged and disengaged therefrom. The transfer units 16 are coupled to (and movable on) a mounting structure of the transfer mechanism 12 that, in an exemplary embodiment, is a center plate 20. The transfer units 16 and center plate 20 collectively form a puck wheel 22 of a desired configuration. In the illustrated embodiment, the puck wheel 22 includes a total of nine (9) transfer units 16 and transfer pucks 18 positioned on the center plate 20, although it is recognized that more or less transfer units 16 and transfer pucks 18 could be provided.

The center plate 20 is fixedly coupled to a motor-driven shaft 24 that provides a substantially operationally constant rotational force to the center plate 20. The center plate 20—along with transfer units 16 and transfer pucks 18 mounted thereto—is thus caused to rotate about a puck transfer axis 26 that is a major axis of rotation, so as to move the transfer pucks 18 about a transfer path 28. As used throughout the description of the preferred embodiment, "rotate" and its variants refer to the movement of an entire transfer puck 18 (and transfer unit 16) about the transfer axis 26, while "spin" and its variants refer to the radial spin of a transfer puck 18 about a puck spin axis 30, which is substantially perpendicular to the puck transfer axis 26, as will be explained further below. A vacuum system 32 is also included in the apparatus 10 that provides a vacuum to the individual transfer units 16 and transfer pucks 18 of the transfer mechanism 12. Vacuum is transferred out from the area of the center plate 20 to the transfer units 16 via a plurality of vacuum passages or tubes (not shown) coupled therebetween.

As shown in FIGS. 1, the cutting system 14 preferably comprises an anvil wheel 34 and a knife roll 36 that interact with one another to cut discrete articles from a continuous web that is provided to the cutting and transfer apparatus 10. While the cutting system 14 is described herein as comprising an anvil wheel 34 and knife roll 36, it is recognized that these components could be reversed—with a knife wheel and anvil roll being utilized as compared to the illustrated embodiment. The anvil wheel 34 includes a central anvil hub 38 from which a plurality of anvil arms 40 extend radially outward about a 360° range of the anvil wheel 34. Each of the anvil arms 40 includes an anvil 42 positioned at the end thereof configured to interact with one or more knife blades 44 on the knife roll 36 to cut a material when a respective anvil 42 is positioned at a cutting location adjacent to a knife blade 44. The plurality of anvil arms 40 of anvil wheel 34 may be replaced with a single contact surface in an alternative embodiment.

In operation, the apparatus 10 receives a continuous web 46 from a source and the web 46 is brought into contact with a transfer puck 18 at a receiving location 48. One of anvils 42 is then caused to rotate into position so as to be aligned with a knife blade 44 on the knife roll 36 and cooperate therewith (i.e., come into contact with) to cut the web 46 proximate a leading edge of the transfer puck 18. After receipt of the web 46 and the cut made near the leading edge, the transfer puck 18 proceeds to travel along the transfer path 28 and past the knife roll 36, at which point the next anvil 42 on anvil wheel 34 rotates into position to cooperate with a knife blade 44 to cut the web 46 proximate the trailing edge of the transfer puck 18 to cut a discrete section from the web 46, to form a discrete article 50 such as an insert or pad. The discrete article 50 is held to the transfer puck 18 by a vacuum and caused to rotate about the transfer path 28 to an article placement location 52, where the section is transferred off from the transfer puck 18 and onto a receiving surface or member 54, as will be explained in greater detail below.

In rotating about the transfer path 28, the velocity and positioning of the transfer units 16 of relative to each other (i.e., the pitch between transfer units 16) may be controlled, so as to subsequently provide for a desired pitch placement of the discrete articles 50 onto the receiving member 54. That is, the transfer units 16 of the transfer mechanism 12 are coupled to the center plate 20 so as to be movable thereon. Each of the transfer units 16 (and transfer pucks 18 thereon) may be circumferentially displaced relative to the center plate 20 in a machine direction 55 to enable a pitch change or altered circumferential spacing of the transfer pucks 18.

In addition to the transfer mechanism 12 providing for a rotation of the transfer units 16 and transfer pucks 18 about the transfer axis 26, the transfer mechanism 12 also provides for a radial spinning of each transfer puck 18 about the puck spin axis 30. The radial spinning of each transfer puck 18 may be a ninety-degree (90°) puck rotation, according to one embodiment, but it is recognized that other amounts of puck rotation could be provided by the transfer mechanism 12.

At the article placement location 52, the discrete articles 50 are transferred onto a receiving surface or member 54 that, according to various embodiments, may be a web of material, a drum, a conveyor belt, or a web of material moving over a drum or conveyor belt, as examples. In an example embodiment, the receiving member 54 is a web of material being conveyed about the surface of a rotating transfer drum 56 at the placement location 52. An adhesive 58 may be applied to the web 54 upstream from the transfer drum 56 using adhesive dispensers 59. The adhesive 58 may be applied to portions of the web 54 prior to the web 54 being moved over the transfer drum 56. As a result, a discrete article 50 being transferred to the web 54 (while on transfer drum 56) may be adhesively attached to the web 54.

According to embodiments, it is recognized that it may be desirable to transfer the discrete articles 50 from the transfer pucks 18 to the receiving member 54 by forcefully applying the discrete articles 50 onto the receiving member 54. As a transfer puck 18 carrying a discrete article 50 reaches the article placement location 52, the transfer puck 18 comes into contact with the receiving member 54. The transfer puck 18 and the receiving member 54 are positioned at the article placement location 52 such that the transfer puck 18 pushes into the receiving member 54 with a desired amount of transfer force. In one embodiment, the discrete article 50 thus contacts adhesive 58 provided on the receiving member 54 (i.e., material web) and is pushed into the adhesive 58 to secure the discrete article 50 in place on the receiving member 54.

To better accommodate and enable this forceful transfer of the discrete article 50 onto the receiving member 54, the transfer puck 18 includes one or more resilient surface members that are hereafter referred to as a puck insert arrangement. The puck insert arrangement includes one or more resilient insert members positioned on an article carrying surface of the transfer puck 18 to help bond, attach, adhesively attach, or otherwise join a discrete article 50 to the receiving member 54. The resilient insert member(s) are configured to be depressed inwardly toward the article carrying surface of the transfer puck 18 when pressure is applied thereto, such as when a compressive force is applied thereto during transfer of a discrete article 50 onto the receiving member 54.

Referring now to FIGS. 2A, 2B, 3, 4, 5A and 5B, and with continued reference to FIG. 1, a structure of a transfer puck 18 that may be included in the apparatus 10, along with individual components/parts thereof, is shown according to an embodiment. The transfer puck 18 is generally constructed of a puck body 60 and a puck insert arrangement 62 that is mated with the puck body 60. The puck insert arrangement 62 includes one or more resilient puck inserts 64, e.g., two (2) inserts in the illustrated embodiment. As indicated above, the resilient puck inserts 64 can assist in transferring a discrete article 50 off of the transfer puck 18 and securing the discrete article 50 in position relative to a receiving member 54. The resilient puck inserts 64 depress inward with applied pressure, such as when a compressive force is applied to the resilient puck inserts 64 during transfer of a discrete article 50 onto the receiving member 54.

The puck body 60 is composed of a rigid material and may be formed as a single, integral body structure or via the joining of multiple components that form the puck body 60. The puck body 60 includes an article carrying surface 66 and an opposing back surface 68. The article carrying surface 66 of the puck body 60 is configured to engage a discrete article 50 and facilitate transferring the article onto a receiving member 54. The back surface 68 of the puck body 60 is configured to provide for engagement of the transfer puck 18 to a respective transfer unit 16 and for communication of a vacuum to the transfer puck 18.

Figure 2A:
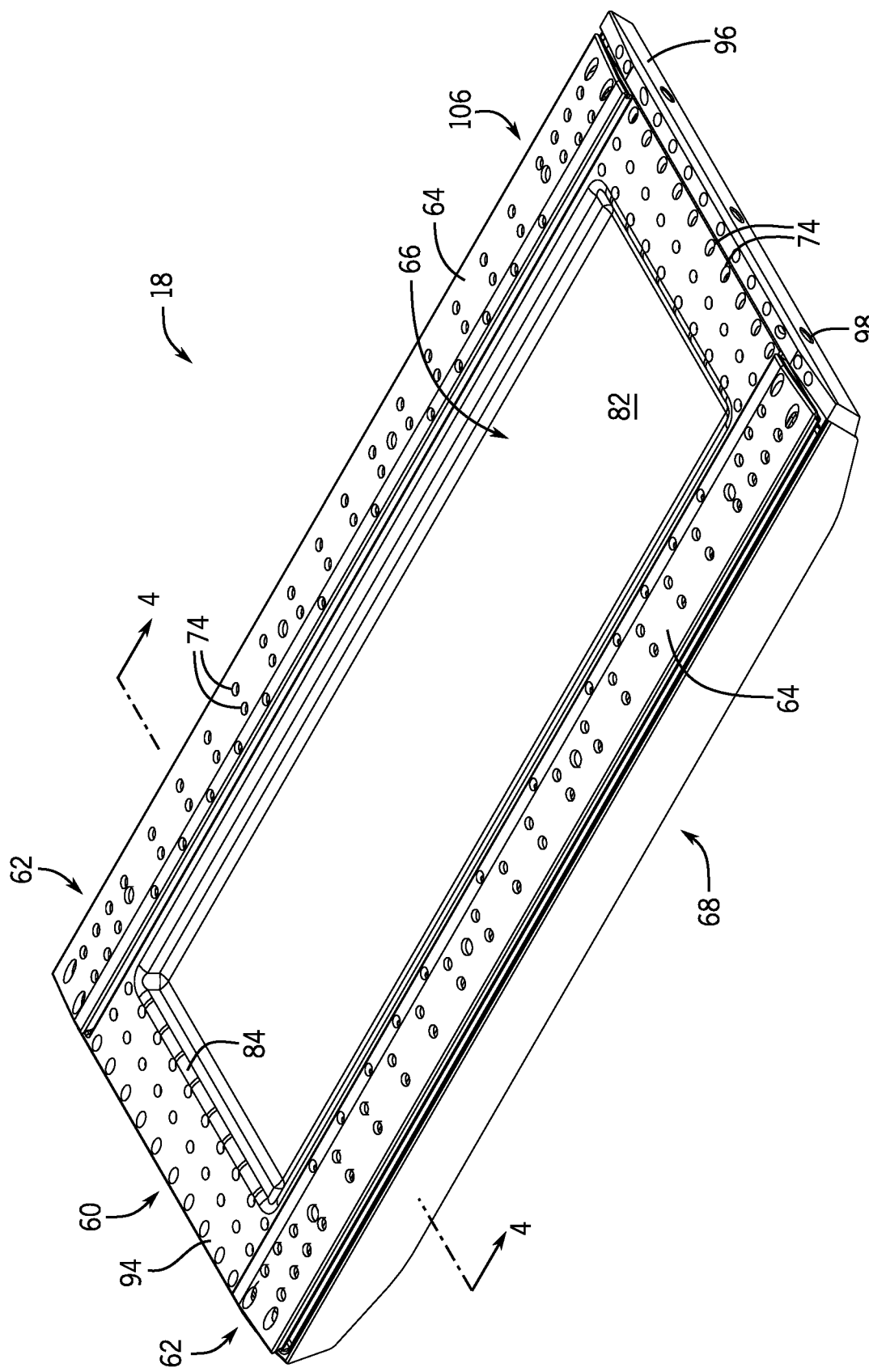
FIGS. 2A and 2B are top and bottom perspective views, respectively, of a transfer puck included in the apparatus of FIG. 1, according to an embodiment of the invention.
Figure 2B:
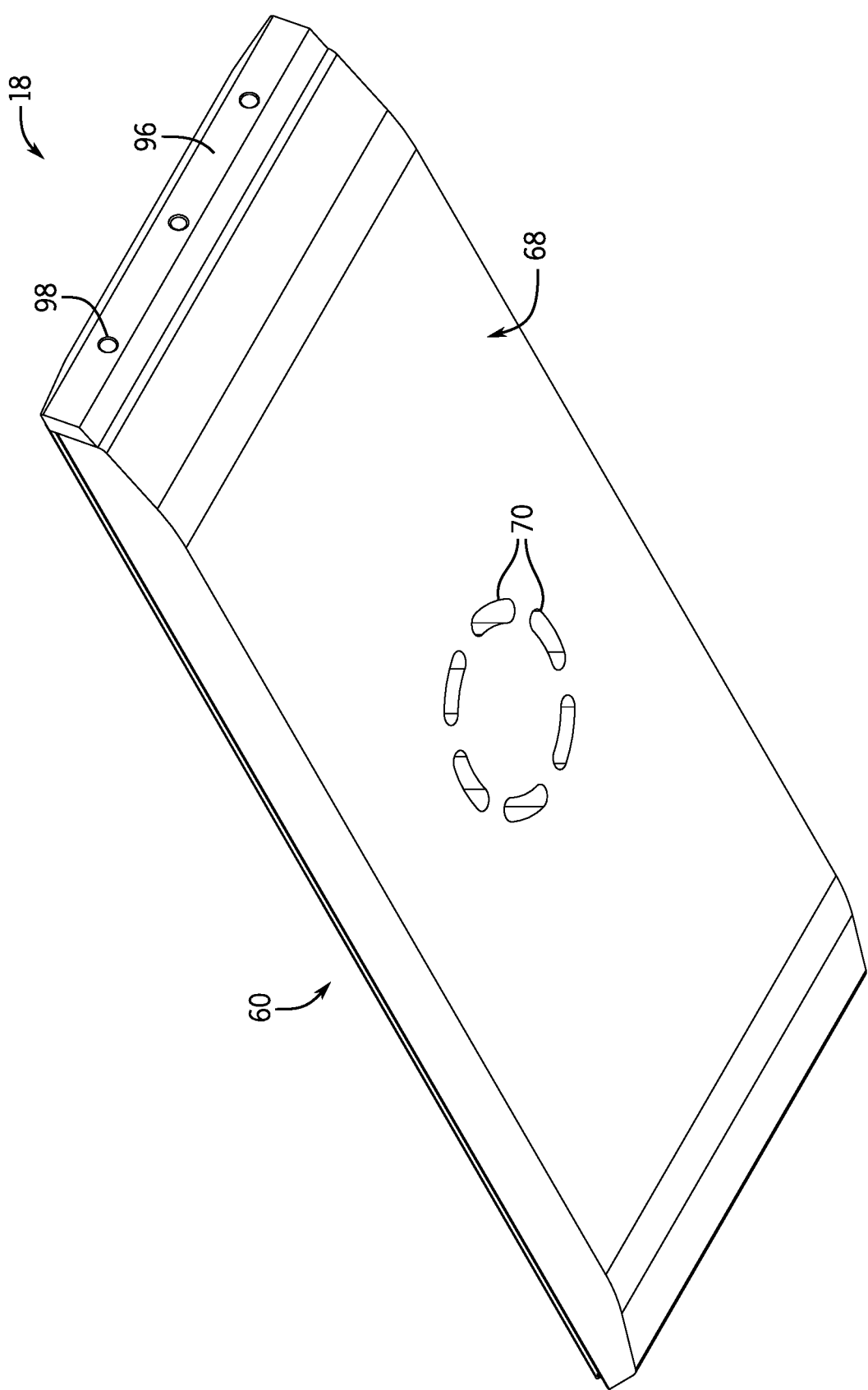

As shown in FIG. 2B, the back surface 68 of transfer puck 18 includes an arrangement of openings 70 that enable vacuum communication between the transfer puck 18 and the vacuum system 32 in the apparatus 10. The openings 70 in the back surface 68 of puck body 60 are fluidly coupled with one or more vacuum passages 72 (FIG. 4) formed in an interior of the puck body 60. The vacuum passages 72 are in fluid communication with vacuum holes 74 (FIGS. 2A and 3, for example) in the article carrying surface 66 and in the puck inserts 64, such that a vacuum is commutable through the transfer puck 18. While not shown in FIG. 2B, it is recognized that the back surface 68 of transfer puck 18 would also include a puck connector that couples the transfer puck 18 to the transfer unit 16. In one example, such a puck connector could be configured as a "quick connect" type connector that allows the transfer puck 18 to be easily swapped out and exchanged on a transfer unit 16 based on the specific set-up of the transfer mechanism 12. The puck connector would also include vacuum channels formed therein that are aligned with the openings 70 in the back surface 68.

Figure 6A:
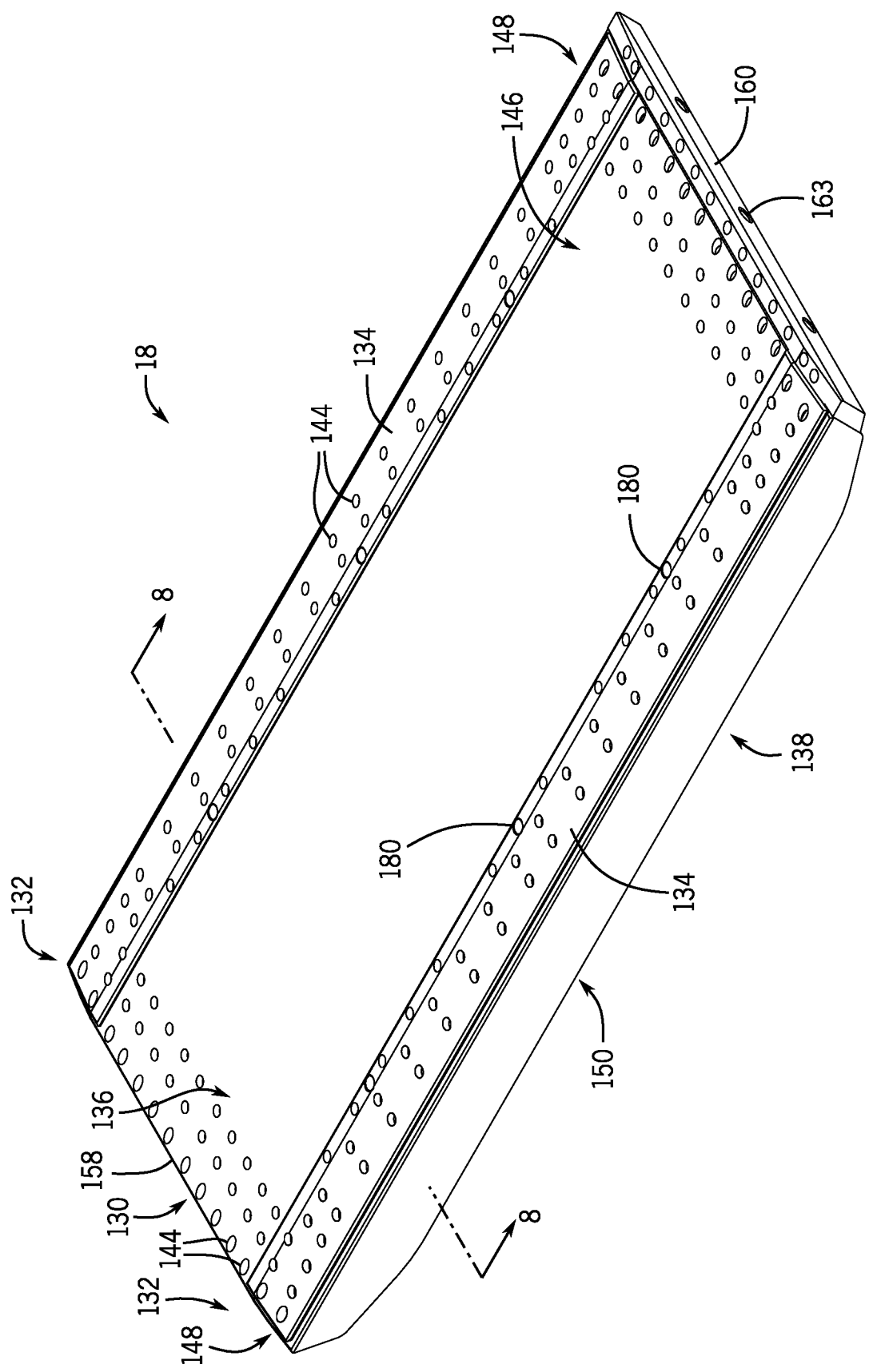
FIGS. 6A and 6B are top and bottom perspective views, respectively, of a transfer puck included in the apparatus of FIG. 1, according to another embodiment of the invention.

The article carrying surface 66 of the transfer puck 18 may generally be characterized as including a central region 76 and a pair of side regions 78. The side regions 78 are aligned lengthwise along the puck body 60 (i.e., run parallel to a lengthwise edge 80 of the puck body 60) and are positioned on opposing sides of the central region 76. In the illustrated embodiment, the central region 76 is defined by a recessed interior area 82 and a raised rim 84 that forms a perimeter about the recessed interior area 82, with the recessed interior area 82 accommodating positioning of a discrete article 50 on the article carrying surface 66, especially when the article is of an increased thickness. In other embodiments, the central region 76 may present a flat, or substantially flat, article carrying surface (as depicted by surface 136 in FIG. 6A) or an arcuate article carrying surface. In one embodiment, each of opposing ends of the central region 76 includes a plurality of vacuum holes 74 formed therein that extend through the article carrying surface 66 so as to be in fluid communication with the vacuum passages 72 formed in an interior of the puck body 60.

Each of the side regions 78 of the article carrying surface 66 is constructed to include an insert channel 88 formed therein that extends lengthwise along the puck body 60. The insert channels 88 are formed to extend along a full length of the puck body 60, and each insert channel 88 may be defined on one side by an edge wall 90 positioned at/adjacent the lengthwise edge 80 of the puck body 60 and on the other side by an interior wall 92 that extends down from the rim 84 of the central region 76. In one embodiment, the edge wall 90 may be shorter than the interior wall 92, such that the edge wall 90 is positioned at a lower level than the rim 84 of the central region 76. The insert channels 88 are closed at one end by an end wall 94 of the puck body 60, while the opposing end of the insert channels 88 are closed by an end cap 96 that is secured onto the puck body 60 (e.g., via fasteners 98) after insertion of the puck inserts 64 in the insert channels 88. The insert channels 88 are constructed to be in fluid communication with the one or more vacuum passages 72 formed in an interior of the puck body 60, with a bottom surface of the insert channels 88 and/or an interior side surface of the channels (i.e., interior wall 92) including openings or open regions 100 that allow for a transfer of vacuum between the vacuum passages 72 and the insert channels 88. One or more mating grooves 102 and ridges 104 may be provided in each of the insert channels 88 that run along a length of the channel. The mating grooves 102 and ridges 104 are configured to mate with corresponding features on the puck inserts 64 to retain the inserts in the insert channels 88, as will be explained in further detail below.

While the puck body 60 is shown in FIGS. 2-5 as including a pair of channels 88 formed in the article carrying surface 66, it is recognized that other embodiments of a puck body 60 could include only a single channel 88 formed in one side region 78. More specifically, an insert channel 88 could be formed in a side region 78 on what is determined to be a leading edge 80a of the transfer puck 18 (opposite from a trailing edge 80b) that would first make contact with the receiving member 54 when the transfer puck 18 is translated to the article placement location 52.

As previously indicated, transfer puck 18 includes a puck insert arrangement 62 that mates with the puck body 60. In the illustrated embodiment, the puck insert arrangement 62 includes a pair of puck inserts 64—with a puck insert 64 corresponding to each side region 78 (and insert channel 88) of the puck body 60. However, it is recognized that the puck insert arrangement 62 could instead include only a single puck insert 64, with the puck insert 64 corresponding to a side region 78 (and insert channel 88) formed adjacent a leading edge 80a of the transfer puck 18, as previously described. Other embodiments of the transfer puck 18 could include a greater number of puck inserts 64 (e.g., 4 inserts), such as where a plurality of puck inserts 64 correspond to each insert channel 88, for example. With one or more puck inserts 64 provided in one or more associated side regions 78 of the puck body 60, the puck insert(s) 64 therefore are positioned about a portion of a perimeter 106 of the transfer puck 18, with the central region 76 of the puck body 60 not having any puck inserts 64 positioned therein.

Figure 3:
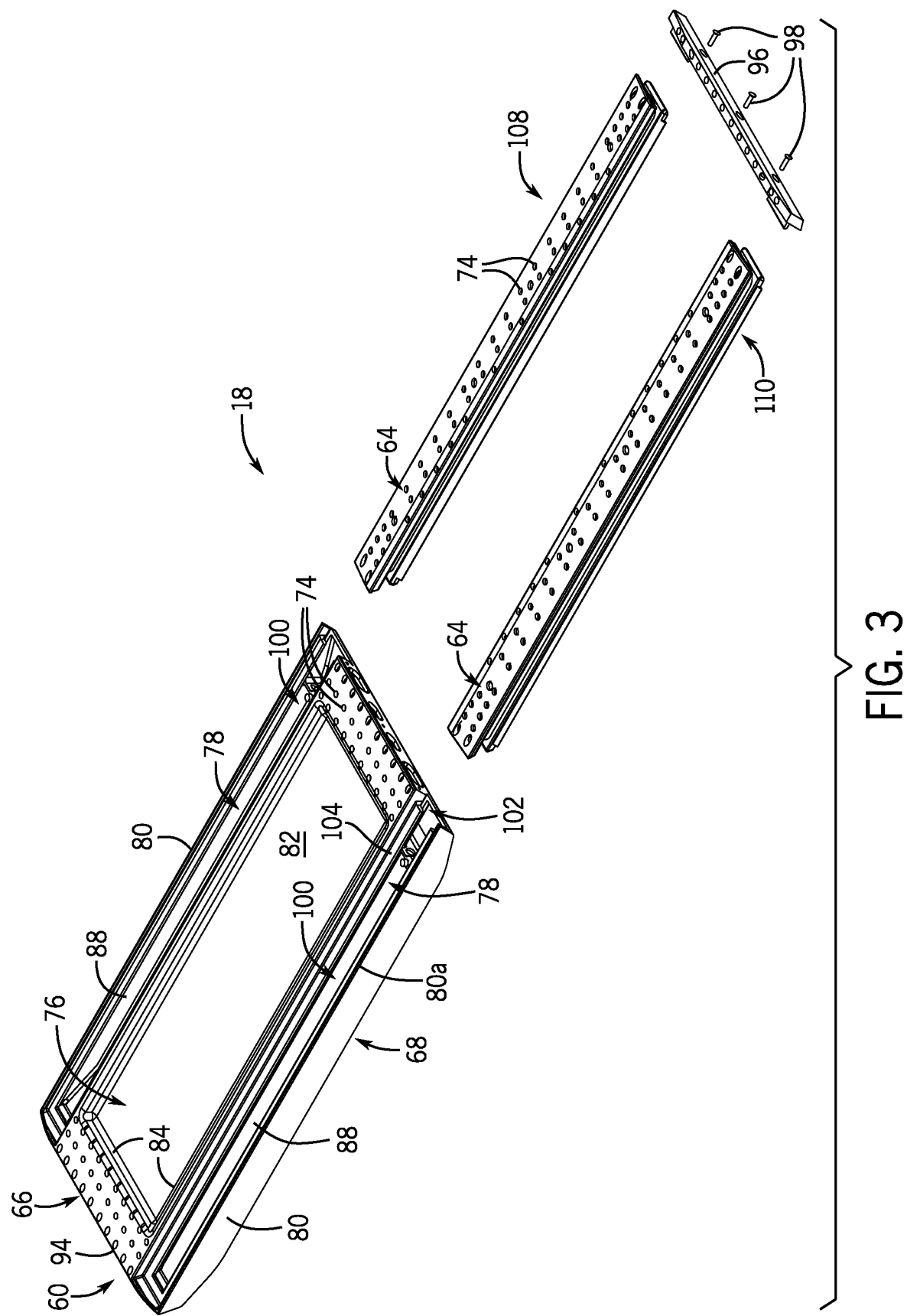
FIG. 3 is an exploded view of the transfer puck of FIGS. 2A and 2B, showing puck inserts and an end cap exploded from a puck body.
Figure 4:
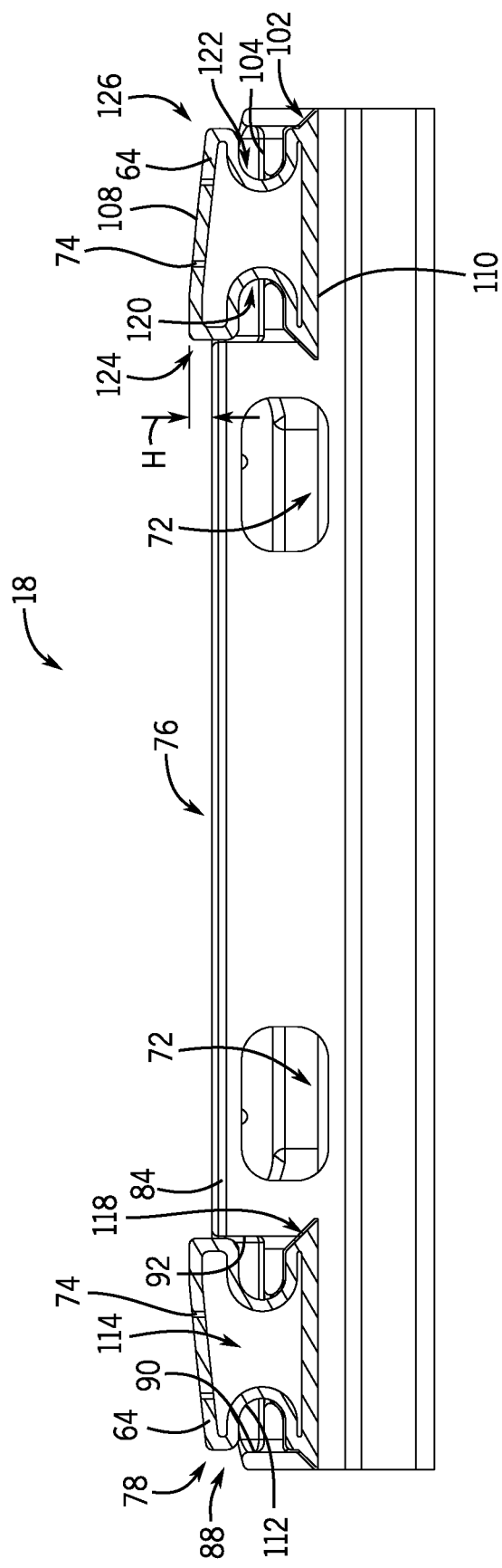
FIG. 4 is a cross-sectional view of the transfer puck of FIG. 2A taken along line 4-4.
Figure 5A:
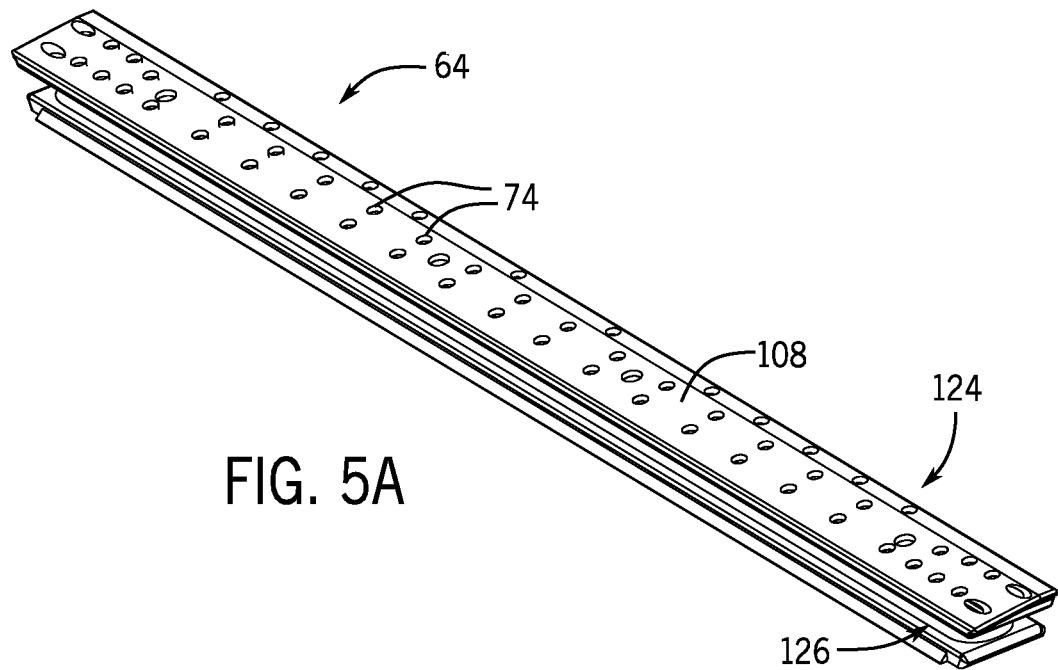
FIGS. 5A and 5B are top and bottom perspective views, respectively, of a puck insert included in the transfer puck of FIGS. 2A and 2B.
Figure 5B:
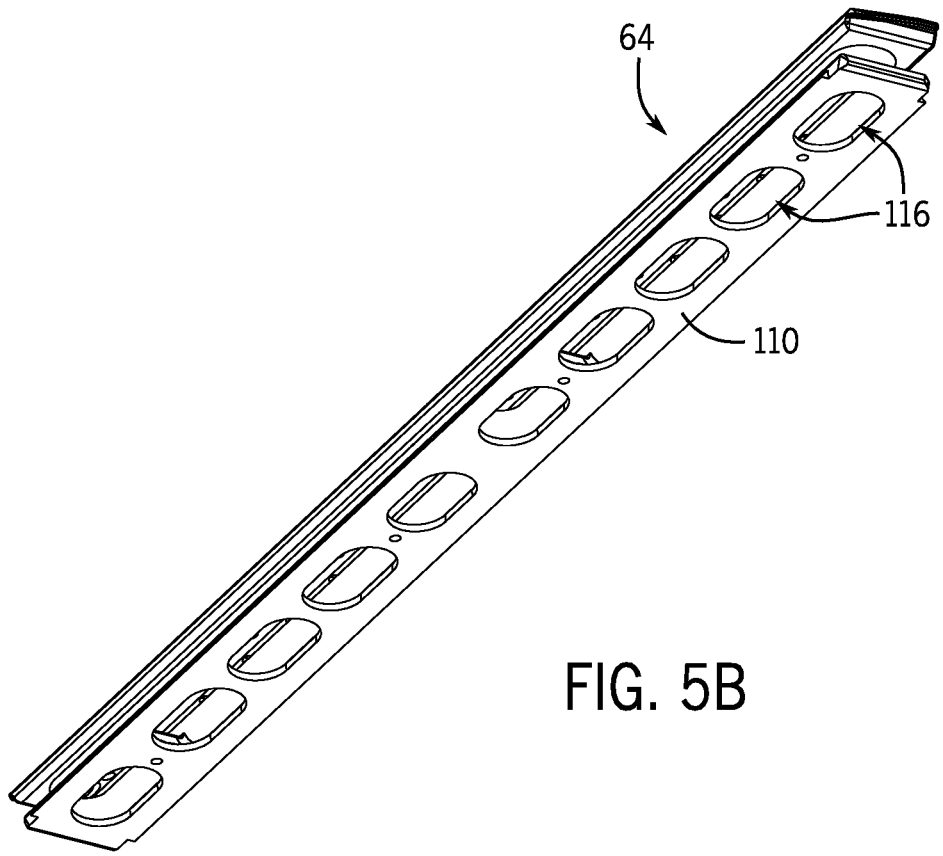

As best shown in FIGS. 3-5, each of the puck inserts 64 is constructed as a generally bellows-shaped member that includes a top wall 108, a bottom wall 110, and a pair of side walls 112. The pair of side walls 112 are formed as curved walls that are inset from the edges of the top wall 108 and the bottom wall 110 and that may flex inwardly and outwardly when pressure is applied to the puck insert 64. The side walls 112, along with a portion of the top wall 108 and the bottom wall 110 define an interior chamber 114 formed within the puck insert 64, such that the puck insert 64 is constructed as a hollow or semi-hollow member. The top wall 108 of the puck insert 64 includes a plurality of vacuum holes 74 formed therein by which a vacuum suction may be applied to a discrete article 50 being retained on the transfer puck 18. The bottom wall 110 of the puck insert 64 includes a plurality of openings 116 formed therein (FIG. 5B) that are aligned with open regions 100 of the insert channels 88. Each of the vacuum holes 74 and openings 116 are in fluid communication with the interior chamber 114 of the puck insert 64, such that a vacuum may be transferred through the puck insert 64. A vacuum may therefore be communicated from the vacuum passages 72 in the puck body 60, through the open regions 100 of the insert channels 88, and in through the openings 116 of the bottom wall 110, whereby the vacuum then is further communicated through the interior chamber 114 and to the vacuum holes 74 formed through the top wall 108 of the puck insert 64. In one embodiment, and as shown in FIG. 2A and FIG. 3, a denser pattern of vacuum holes 74 is provided in the puck insert 64 at opposing ends thereof to provide more holding force at the corners of a discrete article 50 (FIG. 1) secured to the transfer puck 18.

In securing the puck inserts 64 to the puck body 60, each of the puck inserts 64 is seated in a respective insert channel 88 of the article carrying surface 66. The mating grooves 102 and ridges 104 provided in each of the insert channels 88 are configured to secure the puck inserts 64 in place in the insert channels 88 via engagement thereof with the bottom wall 110 of the puck inserts 64. That is, a space defined between the mating grooves 102 and ridges 104 of the insert channel 88 define a track 118 within which the bottom wall 110 of the puck insert 64 is seated. As previously indicated, the pair of curved side walls 112 are inset from the edges of the bottom wall 110, such that the bottom wall 110 protrudes laterally outward therefrom and may engage the track 118 defined by the mating grooves 102 and ridges 104 of the insert channel 88. The ridges 104 of the insert channel 88 provide a pass-through 120 therebetween within which the side walls 112 are positioned, with the bottom wall 110 secured in the track 118 therebelow, thereby effectively locking the puck insert 64 in the insert channel 88 and securing the puck insert 64 relative to the puck body 60. As best shown in FIG. 4, when seated in the insert channel 88, a gap 122 is present between the upper wall of the puck insert 64 and the ridges 104 of the insert channel 88. This gap 122 that is present below the top wall 108 allows for the top wall 108 to depress inward when a compressive force is applied onto the puck insert 64, such as might occur when a discrete article 50 is transferred and pressed onto a receiving member 54.

The transfer puck 18 is constructed such that the puck inserts 64 extend up past a level of the article carrying surface 66 (i.e., up past the side regions 78 and central region 76 of the article carrying surface 66) when the puck inserts 64 are seated in the insert channels 88 of the puck body 60. As shown in FIG. 4, the height H by which the top wall 108 of each puck insert 64 extends up past the article carrying surface 66 may be determined, at least in part, by the compressibility of the puck inserts 64 and how far they compress inward when a force is applied thereto. In the example embodiment, the top wall 108 of each puck insert 64 is provided as a sloped member that is configured to generally match a contour of the puck body 60 (where the rim 84 of the central region 76 is raised relative to the edge walls of the side regions 78). That is, top wall 108 of each puck insert 64 is sloped to angle downward from a higher edge 124 positioned adjacent the central region 76 down to a lower edge 126 positioned adjacent the lengthwise edge 80 of the puck body 60. In being angled as described above, the sloped top wall 108 of the puck insert 64 aids in transferring a discrete article 50 off the transfer puck 18 and onto a receiving member 54. For example, for a puck insert 64 positioned at the leading edge 80a of the transfer puck 18, the lower edge 126 of the top wall 108 will first be brought into contact with a receiving member 54 upon the transfer puck 18 being translated to the article placement location 52. With the top wall 108 angling upward from the lower edge 126, the puck insert 64 (with the discrete article 50 still positioned thereon) is brought into a rolling contact with the receiving member 54 and a pushing force applied from the transfer puck 18 toward/onto the receiving member 54 is applied in a rolling fashion-therefore leading to an efficient transfer of the discrete article 50 off of the transfer puck 18 and onto the receiving member 54.

The puck insert 64, including the top wall 108, the bottom wall 110, and the pair of side walls 112, is composed of a compressible, resilient material that allows the puck insert 64 to depress when a force is applied thereto. According to embodiments, the puck insert 64 may therefore be composed of one or more compressible, deformable, and/or resilient materials, such as rubber, silicone rubber, polyurethane, a thermoplastic polyamide (TPA), a thermoplastic polyurethane (TPU), a thermoplastic elastomer (TPE), or neoprene foam, as non-limiting examples. The resilient puck inserts 64 are configured to depress inwardly toward the article carrying surface 66 of the transfer puck 18 when pressure is applied thereto, such as when a compressive force is applied thereto during transfer of a discrete article 50 onto the receiving member 54. The resilient puck inserts 64 return to their original configuration when the compressive force is removed, such as after the discrete article 50 is transferred onto the receiving member 54.

In an embodiment, it may be desirable to use a material, such as silicone rubber, for at least the top wall 108 or a top surface of the puck insert 64 to provide a non-stick surface that resists accumulation of adhesive thereon, such as might be present on a receiving member 54 (e.g., web material) onto which a discrete article 50 carried by the transfer puck 18 is transferred. For example, in some instances, an adhesive on the web may seep through a discrete article 50 and onto the puck inserts 64 when the discrete article 50 is pressed onto the web by the transfer puck 18.

Puck inserts 64 may be manufactured via a 3-D printing process or other suitable manufacturing technique. The puck inserts 64 assemble within the puck body 60 by sliding the puck inserts 64 into the insert channels 88 from an open end thereof., The bottom wall 110 of each puck insert 64 mates with the track 118 defined in the respective insert channel 88. Upon positioning of the puck inserts 64 in the insert channels 88, an end cap 96 is secured to the puck body 60 (e.g., via fasteners 98) to close an open end of the insert channel 88. The puck inserts 64 are thus retained between the end cap 96 and the closed end wall 94 on the opposite end of the puck body 60.

Referring now to FIGS. 6A, 6B, 7, 8, 9A and 9B, and with continued reference to FIG. 1, a structure of a transfer puck 18 that may be included in the apparatus 10, along with individual components/parts thereof, is shown according to another embodiment. The transfer puck 18 is generally constructed of a puck body 130 and a puck insert arrangement 132 that is mated with the puck body 130. The puck insert arrangement 132 includes one or more resilient puck inserts 134 therein, e.g., two (2) inserts in the illustrated embodiment.

Figure 6B:
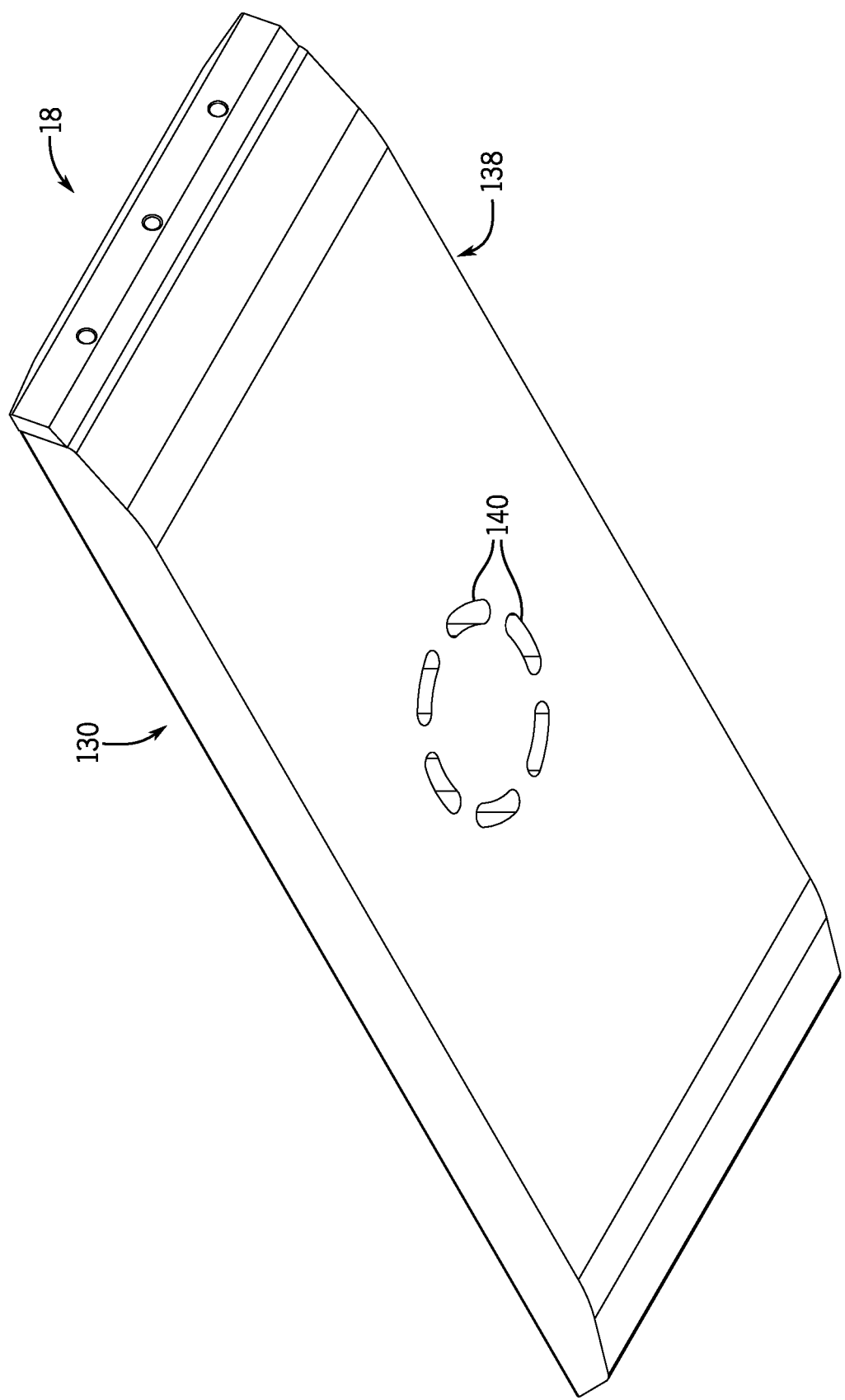

The puck body 130 includes an article carrying surface 136 and an opposing back surface 138. As shown in FIG. 6B, the back surface 138 of transfer puck 18 includes an arrangement of openings 140 therein that provide for a vacuum to be communicated to the transfer puck 18 from the vacuum system 32 in the apparatus 10. The openings 140 in the back surface 138 of puck body 130 are fluidly coupled with one or more vacuum passages 142 (FIG. 8) formed in an interior of the puck body 130, with the vacuum passages 142 in fluid communication with vacuum holes 144 (FIGS. 6A and 7, for example) in the article carrying surface 136 and in the puck inserts 134 such that a vacuum is commutable through the transfer puck 18.

The article carrying surface 136 of the transfer puck 18 may generally be characterized as including a central region 146 and a pair of side regions 148. The side regions 148 are aligned lengthwise along the puck body 130 (i.e., run parallel to a lengthwise edge 150 of the puck body 130) and are positioned on opposing sides of the central region 146. According to an embodiment, the central region 146 is provided as a flat or planar section that includes a plurality of vacuum holes 144 formed therein that extend through the article carrying surface 136 so as to be in fluid communication with the vacuum passages 142 formed in an interior of the puck body 130. In the illustrated embodiment, the vacuum holes 144 are provided on opposing ends of the central region 146 of the article carrying surface 136, but additional vacuum holes 144 may also be provided at other locations of the central region 146.

Each of the side regions 148 of the article carrying surface 136 is constructed to include an insert channel 152 formed therein that extends lengthwise along the puck body 130. The insert channels 152 are formed to extend along a full length of the puck body 130, and each insert channel 152 may be defined on one side by an edge wall 154 positioned at/adjacent the lengthwise edge 150 of the puck body 130 and on the other side by an interior wall 156 that is adjacent the central region 146. In one embodiment, the edge wall 154 may be shorter than the interior wall 156, such that the edge wall 154 is positioned at a lower level than the central region 146. The insert channels 152 are closed at one end by an end surface 158 of the puck body 130, while the opposing end of the insert channels 152 are closed by an end cap 160 that is secured onto the puck body 130 (e.g., via fasteners 163) after insertion of the puck inserts 134 in the channels 152. The insert channels 152 are constructed to be in fluid communication with the one or more vacuum passages 142 formed in the interior of the puck body 130, with a bottom surface of the insert channels 152 and/or an interior side surface of the channels 152 including openings or open regions 162 that allow for a transfer of vacuum between the vacuum passages 142 and the insert channels 152. Mating grooves 164 may be provided in each of the insert channels 152 that run along a length of the channel 152. The mating grooves 164 are configured to mate with corresponding features on the puck inserts 134 to retain the inserts in the inert channels 152, as will be explained in further detail below.

Figure 7:
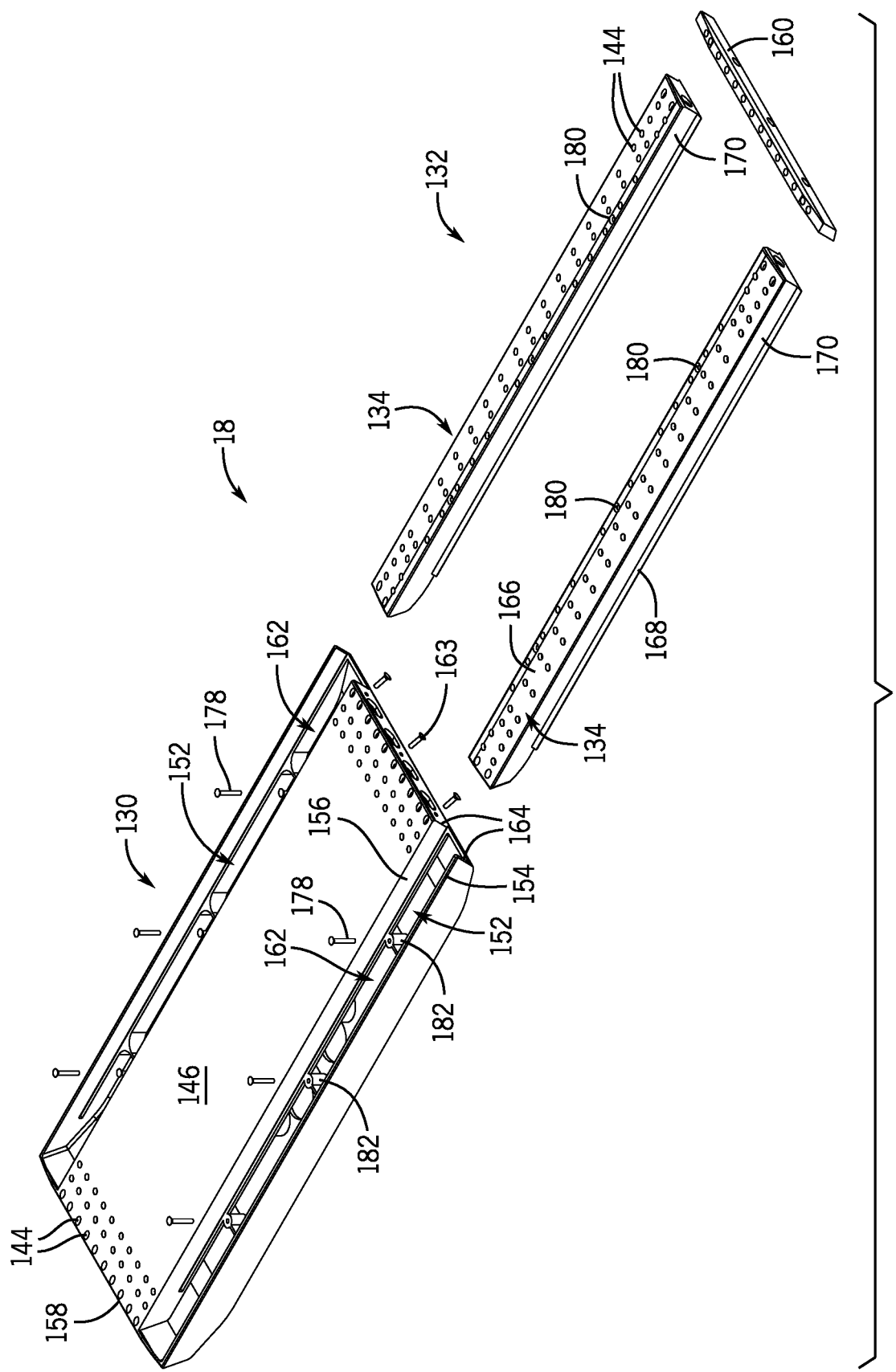
FIG. 7 is an exploded view of the transfer puck of FIGS. 6A and 6B, showing puck inserts and an end cap exploded from a puck body.
Figure 8:
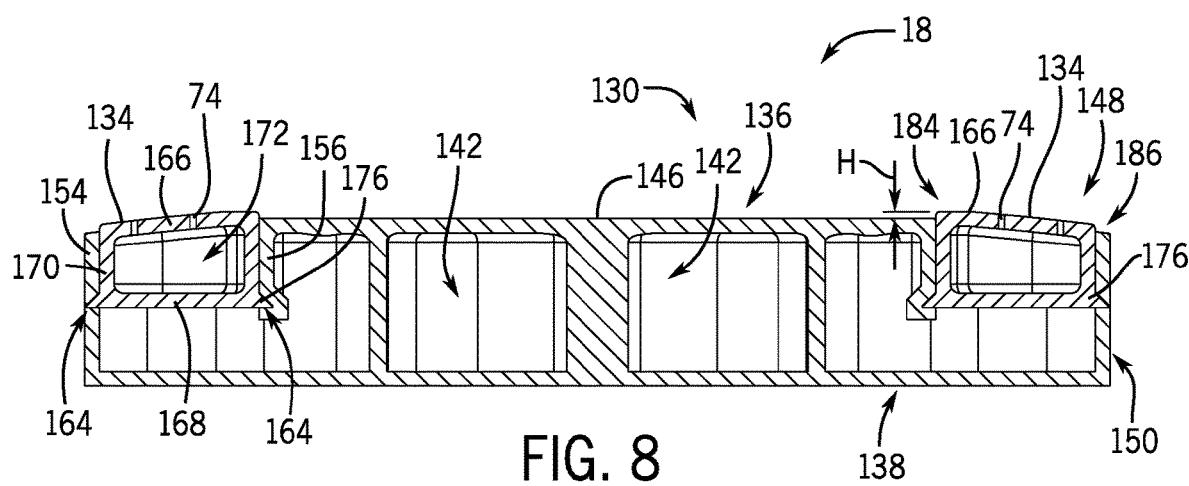
FIG. 8 is a cross-sectional view of the transfer puck of FIG. 6 taken along line 8-8.
Figure 9A:
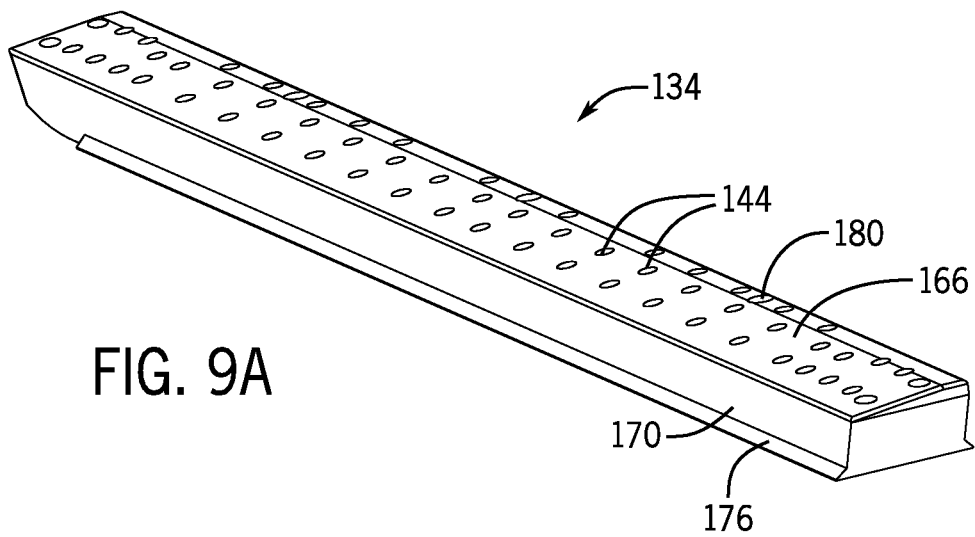
FIGS. 9A and 9B are top and bottom perspective views, respectively, of a puck insert included in the transfer puck of FIGS. 6A and 6B.
Figure 9B:
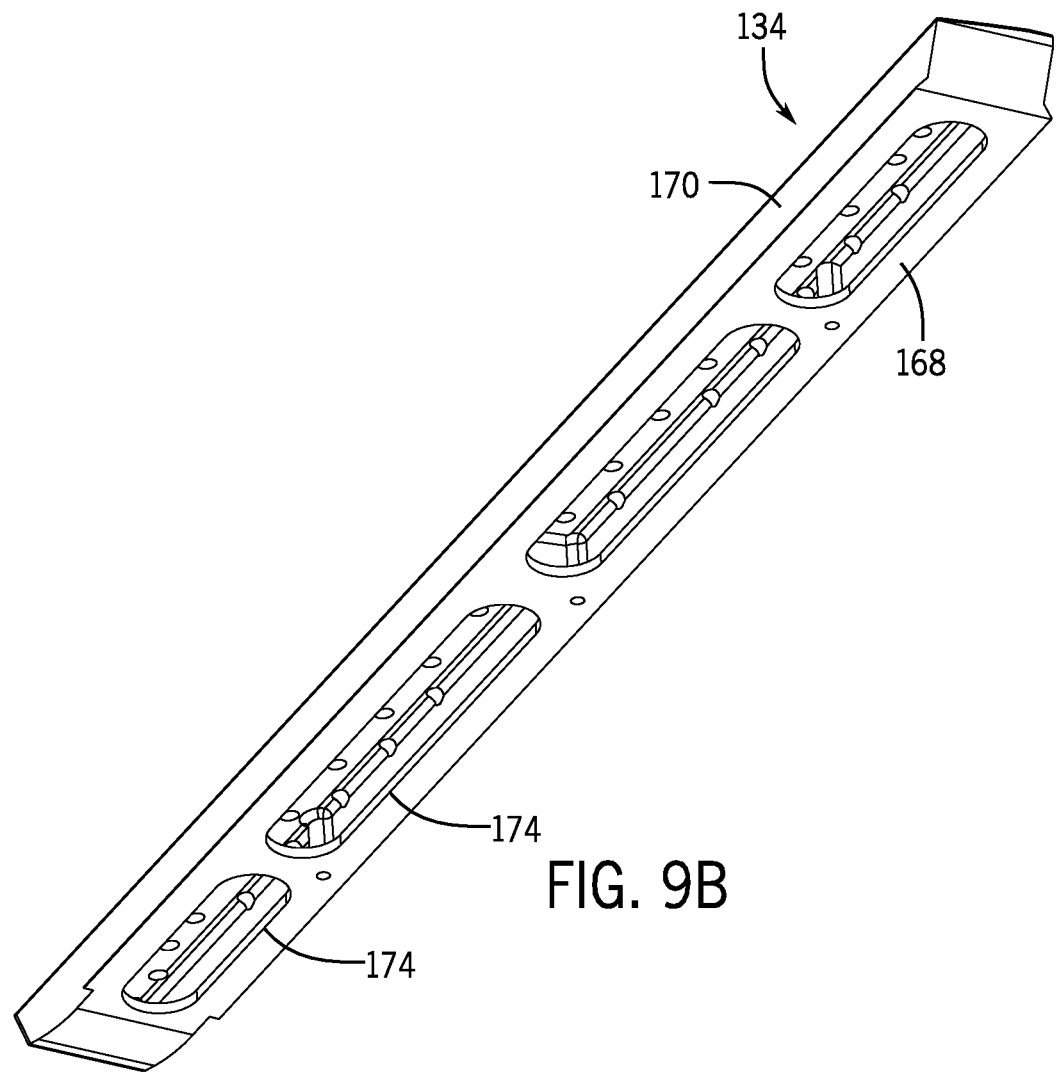

As previously indicated, a puck insert arrangement 132 in included in the transfer puck 18 that is mated with the puck body 130. In the illustrated embodiment, the puck insert arrangement 132 includes a pair of puck inserts 134—with a puck insert 134 provided that corresponds to each side region 148 (and insert channel 152) of the puck body 130. As best shown in FIGS. 7-9, each of the puck inserts 134 is constructed as a generally trapezoid-shaped member that includes a top wall 166, a bottom wall 168, and a pair of side walls 170 that collectively define an interior chamber 172 formed within the puck insert 134, such that the puck insert 134 is constructed as a hollow member. The top wall 166 of the puck insert 134 includes a plurality of vacuum holes 144 formed therein by which a vacuum suction may be applied to a discrete article 50 being retained on the transfer puck 18. The bottom wall 168 of the puck insert 134 includes a plurality of openings 174 formed therein (FIG. 9B) that are aligned with open regions 162 of the insert channels 152. Each of the vacuum holes 144 and openings are in fluid communication with the interior chamber 172 of the puck insert 134, such that a vacuum may be transferred through the puck insert 134. A vacuum may therefore be communicated from the vacuum passages 142 in the puck body 130, through the open regions 162 of the insert channels 152, and in through the openings 174 of the bottom wall 168, whereby the vacuum then is further communicated through the interior chamber 172 and to the vacuum holes 144 on the top wall 166 of the puck insert 134.

In securing the puck inserts 134 to the puck body 130, each of the puck inserts 134 is seated in a respective insert channel 152 of the article carrying surface 136. The mating grooves 164 in each of the insert channels 152 are configured to secure the puck inserts 134 in place in the insert channels 152 via engagement thereof with the bottom wall 168 of the puck inserts 134. That is, angular protrusions 176 on the bottom wall 168 that extend out past the side wall 170 to engage with the grooves 164 in the insert channel 152 to effectively lock the puck insert 134 in the insert channel 152 and secure the puck insert 134 relative to the puck body 130. In one embodiment, fastening pins 178 may also be used to secure the puck inserts 134 in the insert channels 152—with the fastening pins 178 extending down through fastener openings 180 in the top wall 166, down through the interior chamber 172 of the puck insert 134, and engaging with pin holes 182 formed in the side regions 148 of the puck body 130 below the insert channels 152.

As best shown in FIG. 8, the transfer puck 18 is constructed such that the puck inserts 134 extend up past a level of the article carrying surface 136 (i.e., up past the side regions 148 and central region 146 of the article carrying surface 136) when the puck inserts 134 are seated in the insert channels 152 of the puck body 130. The height H by which the top wall 166 of each puck insert 134 extends up past the article carrying surface 136 may be determined, at least in part, by the compressibility of the puck inserts 134 and how far they compress inward when a force is applied thereto. In the example embodiment, the top wall 166 of each puck insert 134 is provided as a sloped member that is angled downward from a higher edge 184 positioned adjacent the central region 146 down to a lower edge 186 positioned adjacent the lengthwise edge 150 of the puck body 130.

As previously described regarding the puck inserts 64 of FIGS. 2-5, the puck inserts 134, including the top wall 166, the bottom wall 168, and the pair of side walls 170, is composed of a compressible, deformable, and/or resilient material that allows for the puck inserts 134 to be depressed when a force is applied thereto. According to embodiments, the puck inserts 134 may therefore be composed of one or more compressible, deformable, or resilient materials, such as rubber, silicone rubber, polyurethane, TPA, TPU, TPE, or neoprene foam, as non-limiting examples. The resilient puck inserts 134 return to their original configuration after the compressive force is removed, such as after transfer the discrete article 50 is transferred onto the receiving member 54.

According to another embodiment, the puck inserts 134 may have a solid construction as opposed to the hollow construction shown in FIG. 8. In such an embodiment, the puck inserts 134 would be constructed of a deformable material like rubber, silicone rubber, polyurethane, TPA, TPU, TPE, or neoprene foam, as non-limiting examples. With a solid insert construction, vacuum holes 144 would be formed through the entire height of the puck inserts 134, so as to communicate a vacuum from the vacuum passages 142 in the puck body 130, through the inserts 134, and to the article carrying surface 136 of the transfer puck 18.

Figure 10:
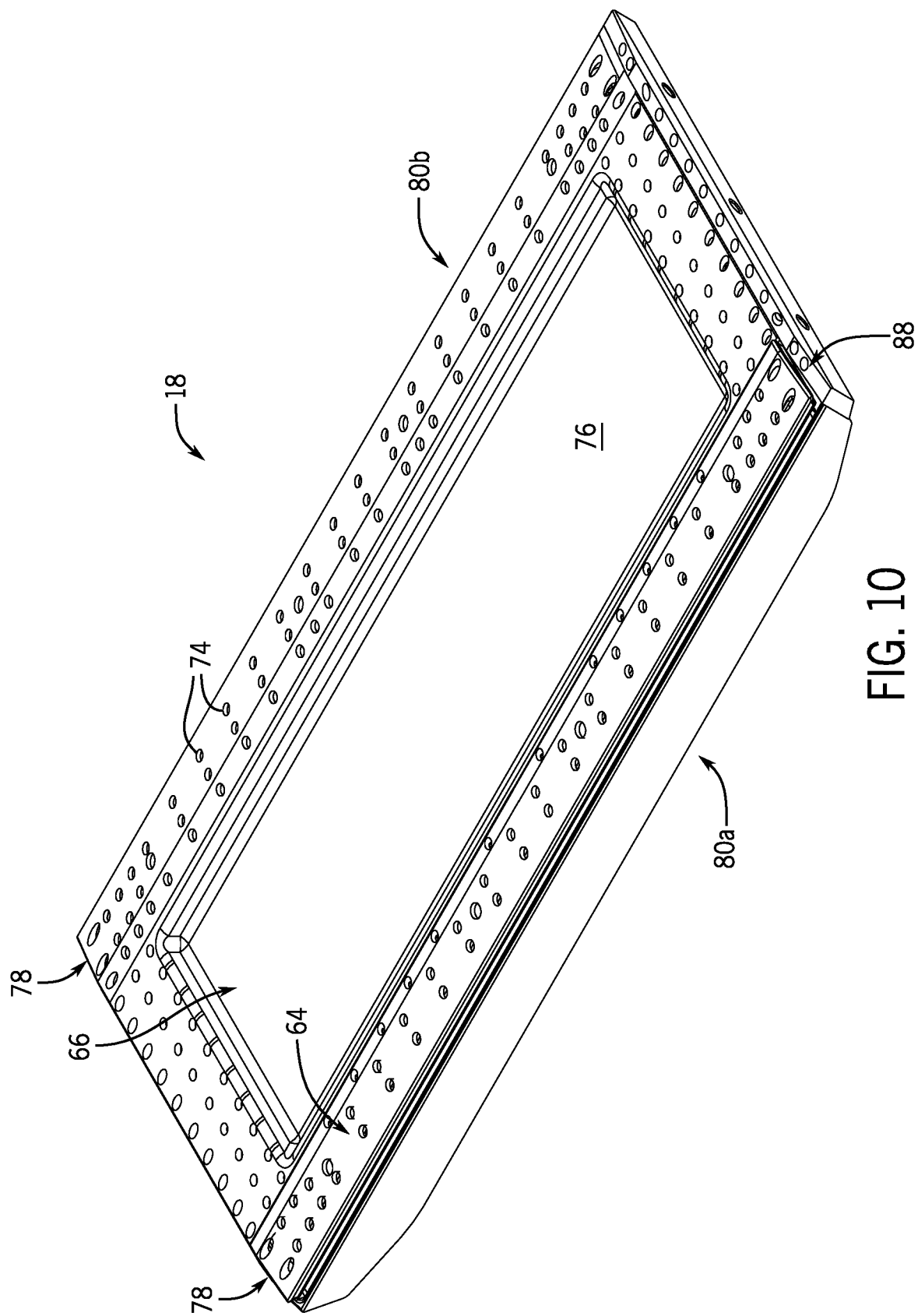
FIG. 10 is a perspective view of a transfer puck included in the apparatus of FIG. 1, according to an embodiment of the invention.

As previously indicated regarding the transfer pucks 18 shown and described in the embodiment of FIGS. 2-5 and in the embodiment of FIGS. 6-9, it is recognized that the transfer puck 18 could be configured to include only a single puck insert rather than a pair of puck inserts. FIG. 10 illustrates an embodiment of a transfer puck 18 that includes only a single puck insert 64 therein, with the puck insert 64 matching that of the embodiment of the puck insert 64 shown and described in FIGS. 2-5. It is recognized, however, that a transfer puck 18 could instead be provided that includes a single puck insert therein that matches the puck insert 134 of FIGS. 6-9.

In the embodiment of FIG. 10, the puck insert 64 is positioned adjacent a leading edge 80a of the transfer puck 18 that would first make contact with the receiving member 54 when the transfer puck 18 is translated to the article placement location 52. As previously described (for FIGS. 2-5), the puck insert 64 mates with an insert channel 88 formed in a side region 78 of the article carrying surface 66, along the leading edge 80a of the transfer puck 18. The side region 78 along the opposing trailing edge 80b of the puck body 60 does not include an insert channel 88 (and puck insert 64 that mates therewith), but instead is configured as an extension of the central region 76. That is, the side region 78 along the trailing edge 80b presents a surface that extends out from the raised rim 84 in a smooth transition therefrom that may be angled slightly downward from the side adjacent the rim 84 to the edge 80b, with the side region 78 including a plurality of vacuum holes 74 therein.

Referring now to FIGS. 11A-11D, side schematic views are provided of a transfer puck 18 and receiving member 54 during transfer of a discrete article 50, in order to better describe and illustrate interaction of the transfer puck 18 with the receiving member 54. While the transfer puck 18 is shown as including a pair of puck inserts 64, 134 in the illustrated embodiment, such as previously described in the embodiments of FIGS. 2-5 and 6-9, it is recognized that the following discussion is equally applicable to the embodiment of FIG. 10 where the transfer puck 18 includes only a single puck insert positioned adjacent leading edge 80a.

Figure 11B:
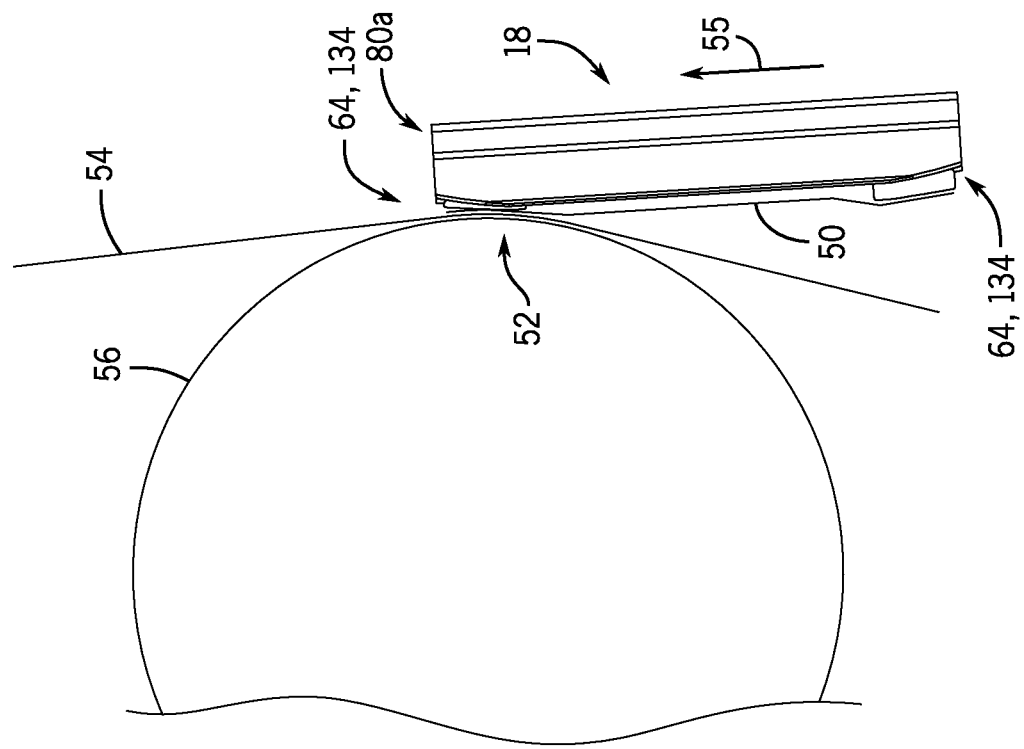
FIGS. 11A-11D are side schematic views of a puck interacting with a receiving member during transfer of a discrete article, according to an embodiment of the invention.
Figure 11A:
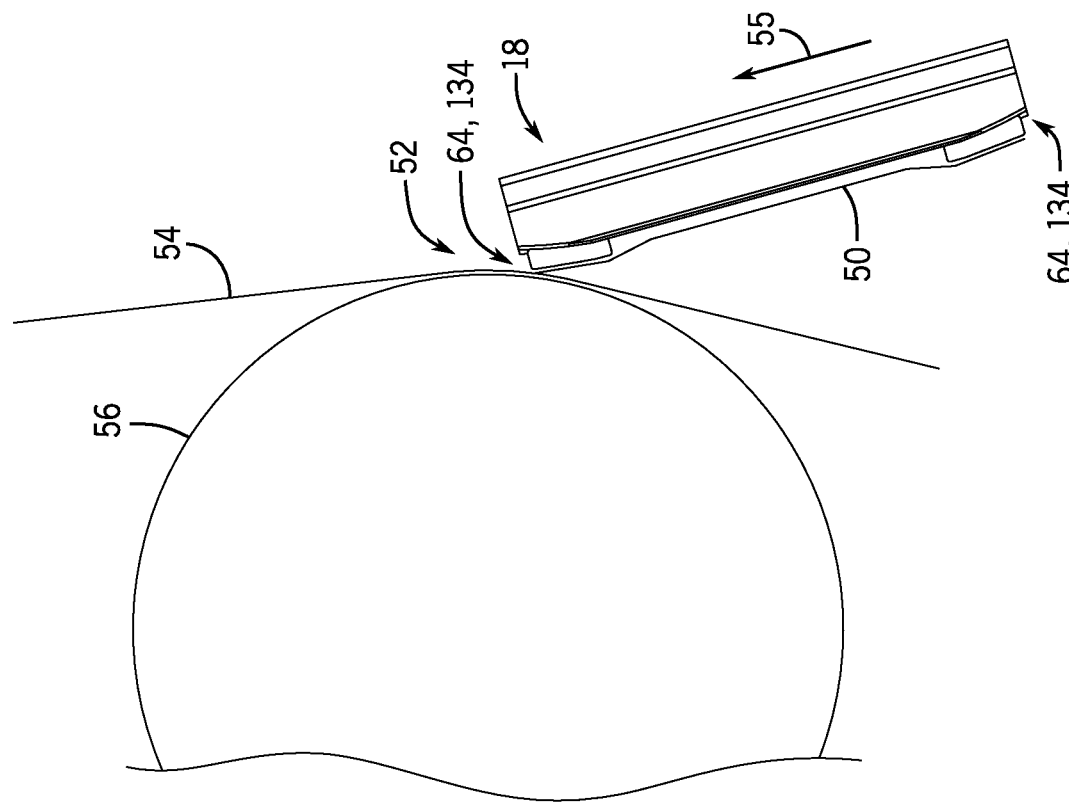

As shown in FIG. 11A, the transfer puck 18 moves in a machine direction 55 toward an article placement location 52 where the discrete article 50 is to be attached to the receiving member 54. At this location, the resilient puck inserts 64, 134 are in an at-rest configuration (i.e., in an uncompressed or non-depressed state) where they protrude above the article carrying surface 66 of the transfer puck 18.

At the position shown in FIG. 11B, the leading edge 80a of the transfer puck 18 has reached the article placement location 52 and comes into contact with the receiving member 54 (e.g., web 54 and transfer drum 56) due to an interference between the path of travel of the transfer puck 18 and the receiving member 54. As the transfer puck 18 comes into contact with the receiving member 54, an application force is generated between the transfer puck 18 and the receiving member 54 that aids in the transfer of the discrete article 50 off from the transfer puck 18 and onto the receiving member 54. This application force that is generated causes the puck insert 64, 134 adjacent the leading edge 80a to be depressed inwardly toward the article carrying surface 66 of the transfer puck 18, such that the top surface of the puck insert 64, 134 is generally level with the article carrying surface 66, in one embodiment. This depression of the puck insert 64, 134 lessens the forces and stresses imparted onto the discrete article 50 and the receiving member 54, so as to prevent damage that might occur thereto during the transfer of the discrete article 50 while enabling an effective transfer of the discrete article 50 onto the receiving member 54.

Figure 11D:
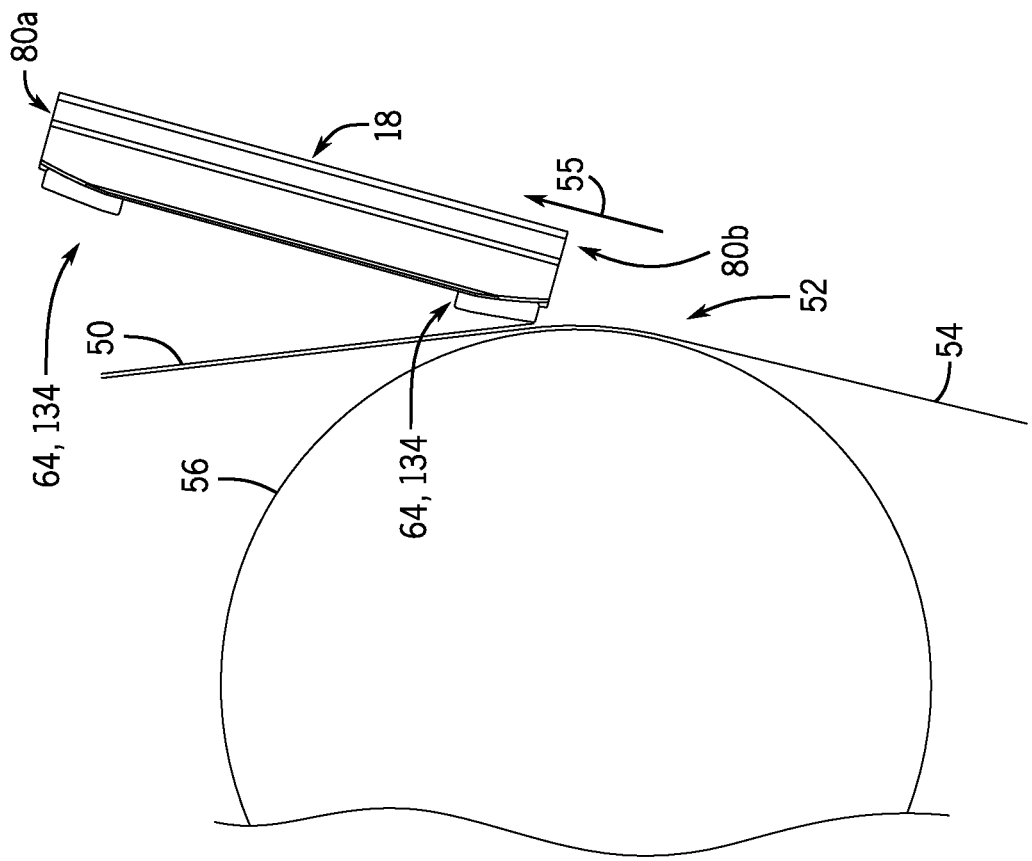
Figure 11C:
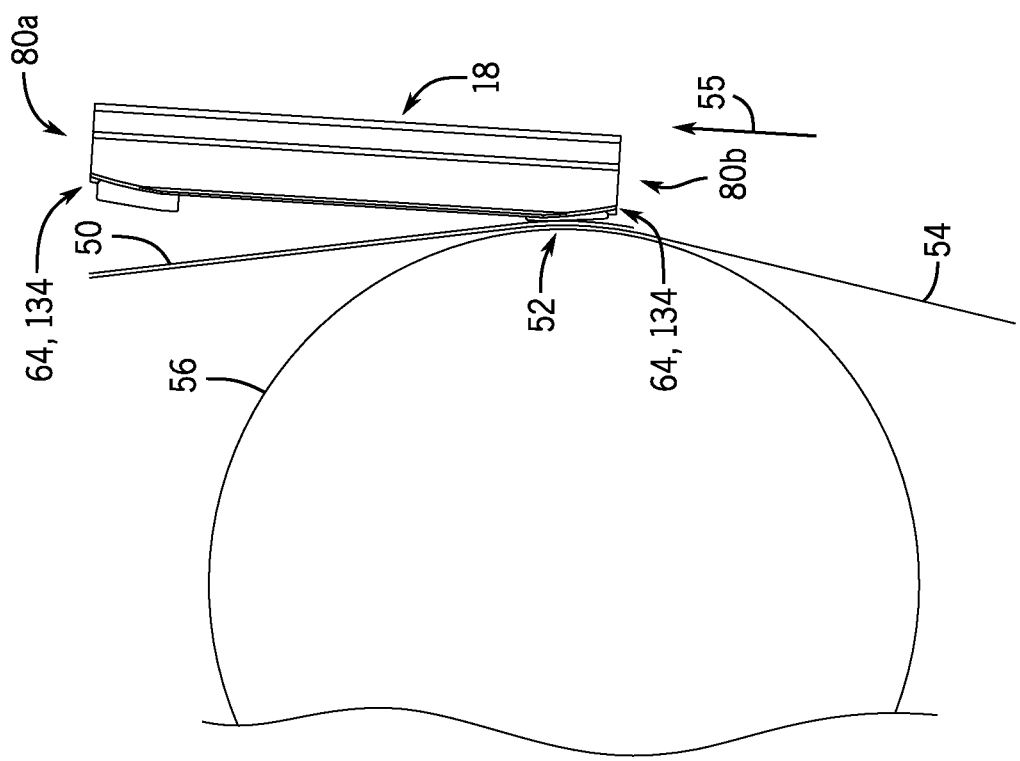

Referring now to FIG. 11C, the leading edge 80a of the transfer puck 18 has rotated past the article placement location 52 such that the puck insert 64, 134 adjacent the leading edge 80a is no longer in contact with the receiving member 54. Additionally, the puck insert 64, 134 adjacent the trailing edge 80b has reached the article placement location 52 and comes into contact with the receiving member 54 (e.g., web 54 and transfer drum 56) due to an interference between the path of travel of the transfer puck 18 and the receiving member 54. With the puck insert 64, 134 adjacent the leading edge 80a no longer in contact with the receiving member 54, the puck insert 64, 134 is allowed to return or spring back to its at-rest configuration where it protrudes above the article carrying surface 66 (i.e., its uncompressed or non-depressed state), as the application force previously acting thereon has been removed at this location. Conversely, for the puck insert 64, 134 adjacent the trailing edge 80b that has now reached the article placement location 52, the puck insert 64, 134 is brought into contact with the receiving member 54. As the trailing edge puck insert 64, 134 comes into contact with the receiving member 54, an application force is generated that causes the puck insert 64, 134 to be depressed inwardly toward the article carrying surface 66 of the transfer puck 18, such that the top surface of the puck insert 64, 134 is generally level with the article carrying surface 66, in one embodiment. This depression of the puck insert 64, 134 lessens the forces and stresses imparted onto the discrete article 50 and the receiving member 54, so as to prevent damage that might occur thereto during the transfer of the discrete article 50 while enabling an effective transfer of the discrete article 50 onto the receiving member 54.

At the position shown in FIG. 11D, the transfer puck 18 has rotated completely past the article placement location 52 such that both the leading edge and trailing edge puck inserts 64, 134 are no longer in contact with the receiving member 54. With the puck inserts 64, 134 both no longer in contact with the receiving member 54, the puck inserts 64, 134 are both allowed to return or spring back to their at-rest configuration where they protrude above the article carrying surface 66 (i.e., uncompressed or non-depressed state), as the application force previously acting thereon has been removed at this location.

It is recognized that the transfer pucks described above in FIGS. 2-10 can be implemented in other systems or apparatuses besides the cutting and transfer apparatus 10 of FIG. 1, according to additional embodiments of the invention. Such systems or apparatuses may comprise a cutting and transfer apparatus of a different construction from the apparatus 10 previously described or a turn-and-place apparatus that is operable to receive a product or component part in one orientation, spin (or "turn") the component part to a desired predetermined angle, and then transfer (or "place") the component part onto another web or receiving member for use in another step in a production process.

Figure 12:
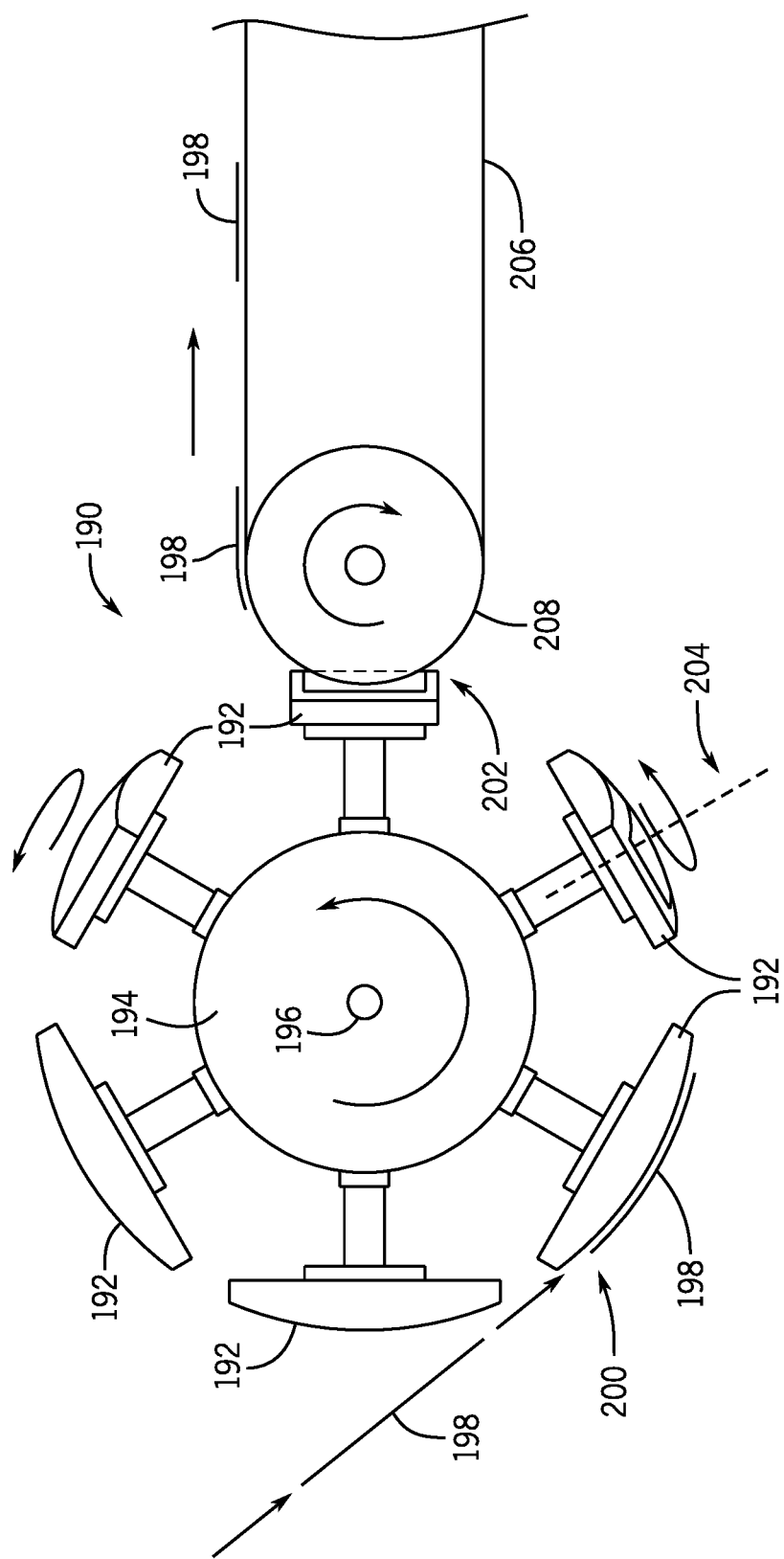
FIG. 12 is a product turner and placer in which embodiments of the invention may be implemented, according to an embodiment of the invention.

An example of a turn-and-place apparatus is provided in FIG. 12, according to an embodiment. The turn-and-place apparatus 190 is configured as a rotary device and includes a plurality of transfer pucks 192 mounted to a center hub 194 that rotates about a central axis 196. The apparatus 190 receives discrete articles 198 at a pick-up point or receiving location 200, such as from a vacuum drum (not shown) for example, with the articles 198 being successively and individually picked-up by the transfer pucks 192. The transfer pucks 192 retain the discrete articles 198 thereon as they rotate on the central plate 194 and about the central axis 196 from the receiving location 200 to an article placement location 202. While moving between the receiving location 200 and the article placement location 202, each of the transfer pucks 192 also spins about a spin axis 204 thereof to reorient the discrete article 198 held thereon. In one embodiment, the discrete article 198 may be turned 90 degrees. After the discrete article 198 have been rotated 90 degrees, they are deposited at the article transfer location 202 onto a conveyor 206 that is being rotated about a drum 208. The conveyor 206 then transports the discrete articles 198 for further processing or to a packaging device, as required by a particular application.

In yet other embodiments, the transfer pucks described above in FIGS. 2-10 may be utilized in other types of units configured to transfer discrete articles from a receiving location to an article placement location, such as, for example, re-pitching units that pick up discrete pieces traveling at a first spacing (pitch) and transfer the discrete pieces at an article placement location at a larger spacing (pitch) without changing the rotational orientation of the discrete pieces. As yet another non-limiting example, the transfer pucks described above in FIGS. 2-10 may be utilized in a device that picks up and deposits discrete pieces in a manner that changes the orientation of the discrete pieces without changing the pitch or spacing between discrete pieces.

In still other embodiments, resilient inserts as described above in FIGS. 2-10 may be utilized in other types of units configured to handle webs of material or discrete articles. Such units may include anvils, knife shafts, transfer rolls, no scrap ear (NoSE) pucks, and waistband units, as non-limiting examples.

Beneficially, embodiments of the invention thus provide a transfer puck and overall transfer apparatus that efficiently transfers a wide range of discrete components onto a receiving surface, so as to accommodate the transferring of discrete articles of differing types and sizes. The transfer puck ensures that the discrete component is transferred accurately onto the receiving surface and done so without damaging the discrete component or the receiving surface even when force is applied during application and transfer of the discrete component.

Therefore, according to one embodiment of the invention, an apparatus includes a transfer mechanism configured to transfer a plurality of discrete articles from an article receiving location to an article placement location, the transfer mechanism including a plurality of transfer units that move along a transfer path from the article receiving location to the article placement location, each of the plurality of transfer units including a transfer puck that is selectively operable to carry a discrete article thereon as the transfer puck travels between the article receiving location and the article placement location. The apparatus also includes a receiving member positioned at the article placement location to receive the plurality of discrete articles from the transfer mechanism. Each of the transfer pucks includes a puck body with a back surface and an article carrying surface having vacuum holes formed therein to retain the discrete article thereon via a vacuum, the article carrying surface including a central region and at least one side region adjacent the central region, the at least one side region aligned lengthwise along the puck body. Each of the transfer pucks also includes a puck insert arrangement comprising one or more puck inserts positioned about a portion of a perimeter of the transfer puck, with each of the one or more puck inserts engaged with the puck body in a respective side region and sized to protrude above the article carrying surface. Each of the one or more puck inserts is a resilient structure that is depressible inward toward the article carrying surface upon an application of force thereto.

According to another embodiment of the invention, a transfer puck for transferring and placing a discrete article onto a receiving surface is provided. The transfer puck includes a puck body with a back surface and an article carrying surface having vacuum holes formed therein to retain the discrete article thereon via a vacuum, the article carrying surface including a central region and at least one side region adjacent the central region, the at least one side region aligned lengthwise along the puck body. The transfer puck also includes a puck insert arrangement including one or more puck inserts positioned about a portion of a perimeter of the transfer puck, with each of the one or more puck inserts engaged with the puck body in a respective side region to protrude above the article carrying surface. Each of the one or more puck inserts is a resilient structure that is depressible inward toward the article carrying surface upon an application of force thereto.

According to yet another embodiment of the invention, a method of transferring a discrete article from a transfer puck to a receiving surface is provided. The method includes retaining the discrete article on an article carrying surface of the transfer puck via a vacuum communicated through the transfer puck, the transfer puck including one or more puck inserts affixed to the article carrying surface at one or more side regions thereof so as to be positioned about a portion of a perimeter of the transfer puck, with each of the one or more puck inserts protruding above the article carrying surface and comprising a resilient structure that is depressible inward toward the article carrying surface upon an application of force thereto. The method also includes transferring the discrete article off of the transfer puck and onto the receiving surface at an article placement location, wherein transferring the discrete article includes bringing the discrete article retained on the article carrying surface into contact with the receiving surface at the article placement location and applying a pushing force from the transfer puck onto the receiving surface as the discrete article is brought into contact with the article carrying surface to transfer the discrete article from the article carrying surface onto the receiving surface. The pushing force causes the one or more puck inserts to depress inwardly toward the article carrying surface.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
a transfer mechanism configured to transfer a plurality of discrete articles from an article receiving location to an article placement location, the transfer mechanism including a plurality of transfer units that move along a transfer path from the article receiving location to the article placement location, each of the plurality of transfer units including a transfer puck that is selectively operable to carry a discrete article thereon as the transfer puck travels between the article receiving location and the article placement location; and
a receiving member positioned at the article placement location to receive the plurality of discrete articles from the transfer mechanism;
wherein each of the transfer pucks comprises:
a puck body comprising a back surface and an article carrying surface having vacuum holes formed therein to retain the discrete article thereon via a vacuum, the article carrying surface including a central region and at least one side region adjacent the central region, the at least one side region aligned lengthwise along the puck body; and
a puck insert arrangement comprising one or more puck inserts positioned about a portion of a perimeter of the transfer puck, with each of the one or more puck inserts engaged with the puck body in a respective side region and sized to protrude above the article carrying surface;
wherein each of the one or more puck inserts comprises a resilient structure that is depressible inward toward the article carrying surface upon an application of force thereto.

2. An apparatus according to claim 1, wherein the puck insert arrangement comprises a pair of puck inserts.

3. An apparatus according to claim 1, wherein the at least one side region comprises a pair of side regions on opposing sides of the central region; and
wherein the puck body comprises an insert channel formed in each side region of the pair of side regions, with a puck insert of the one or more puck inserts slidingly engaging each respective insert channel.

4. An apparatus according to claim 3, further comprising an end cap secured to at least one end of the puck body, the end cap closing off the insert channel to secure the puck insert within the insert channel.

5. An apparatus according to claim 1, wherein the puck body comprises one or more vacuum channels formed therein to provide a fluid flow path for a vacuum from the back surface to the vacuum holes of the article carrying surface; and wherein each of the one or more puck inserts comprises a hollow member that defines an interior chamber, the interior chamber in fluid communication with the vacuum channels of the puck body.

6. An apparatus according to claim 5, wherein each of the one or more puck inserts comprises:
   a top wall including the vacuum holes formed therein;
   a bottom wall including one or more openings formed therein; and
   a pair of side walls positioned between the top wall and the bottom wall to space the top wall from the bottom wall;
   wherein the top wall, the bottom wall, and the pair of side walls define the interior chamber; and
   wherein a vacuum is communicated from the vacuum channels of the puck body, through the openings in the bottom wall, and through the interior chamber, to the vacuum holes in the top wall.

7. An apparatus according to claim 6, wherein each of the one or more puck inserts comprises a trapezoid-shaped member where the pair of side walls are parallel.

8. An apparatus according to claim 6, wherein, for each of the one or more puck inserts, the top wall is angled from a higher edge positioned adjacent the central region down to a lower edge positioned adjacent a lengthwise edge of the puck body.

9. An apparatus according to claim 6, wherein each of the one or more puck inserts comprises a bellows-shaped member that flexes and depresses inward upon an application of force thereto.

10. An apparatus according to claim 1, wherein each of the one or more puck inserts is composed of rubber, silicone rubber, polyurethane, a thermoplastic polyurethane (TPU), a thermoplastic elastomer (TPE), or neoprene foam.

11. An apparatus according to claim 1, wherein the transfer mechanism is configured to bring each of the plurality of transfer units into forcible contact with the receiving member at the article placement location to transfer the plurality of discrete articles onto the receiving member, with the forcible contact causing the resilient structure to depress inward toward the article carrying surface.

12. An apparatus according to claim 1, wherein the puck insert arrangement comprises a single puck insert positioned on a leading edge of the transfer puck that first comes into contact with the receiving member at the article placement location.

13. A transfer puck for transferring and placing a discrete article onto a receiving surface, the transfer puck comprising:
   a puck body comprising a back surface and an article carrying surface having vacuum holes formed therein to retain the discrete article thereon via a vacuum, the article carrying surface including a central region and at least one side region adjacent the central region, the at least one side region aligned lengthwise along the puck body; and
   a puck insert arrangement comprising one or more puck inserts positioned about a portion of a perimeter of the transfer puck, with each of the one or more puck inserts engaged with the puck body in a respective side region to protrude above the article carrying surface;
   wherein each of the one or more puck inserts comprises a resilient structure that is depressible inward toward the article carrying surface upon an application of force thereto.

14. A transfer puck according to claim 13, wherein the at least one side region comprises a pair of side regions positioned on opposing sides of the central region; and
   wherein the puck body comprises an insert channel formed each respective side region of the pair of side regions, with each puck insert of the one or more puck inserts slidingly engaging a respective insert channel.

15. A transfer puck according to claim 14, wherein the puck insert arrangement comprises a pair of puck inserts, with each puck insert of the pair of puck inserts engaged with a respective insert channel.

16. A transfer puck according to claim 13, wherein the puck body comprises one or more vacuum channels formed therein to provide a fluid flow path for a vacuum from the back surface to the vacuum holes of the article carrying surface; and
   wherein each of the one or more puck inserts comprises a hollow member that defines an interior chamber, the interior chamber in fluid communication with the vacuum channels of the puck body.

17. A transfer puck according to claim 16, wherein each of the one or more puck inserts comprises:
   a top wall including the vacuum holes formed therein;
   a bottom wall including one or more openings formed therein; and
   a pair of side walls positioned between the top wall and the bottom wall to space the top wall from the bottom wall;
   wherein the top wall, the bottom wall, and the pair of side walls define the interior chamber; and
   wherein a vacuum is communicated from the vacuum channels of the puck body, through the openings in the bottom wall, and through the interior chamber, to the vacuum holes in the top wall.

18. A transfer puck according to claim 17, wherein, for each of the one or more puck inserts, the top wall is angled from a higher edge positioned adjacent the central region down to a lower edge positioned adjacent a lengthwise edge of the puck body.

19. A transfer puck according to claim 13, wherein each of the one or more puck inserts comprises a bellows-shaped member that flexes and depresses inwardly upon an application of force thereto.

20. A transfer puck according to claim 13, wherein the central region comprises a recessed region, with the side regions and each of the one or more puck inserts protruding above the recessed region.

21. A method of transferring a discrete article from a transfer puck to a receiving surface, the method comprising:
   retaining the discrete article on an article carrying surface of the transfer puck via a vacuum communicated through the transfer puck, the transfer puck including one or more puck inserts affixed to the article carrying surface at one or more side regions thereof so as to be positioned about a portion of a perimeter of the transfer puck, with each of the one or more puck inserts protruding above the article carrying surface and comprising a resilient structure that is depressible inward toward the article carrying surface upon an application of force thereto; and
   transferring the discrete article off of the transfer puck and onto the receiving surface at an article placement location, wherein transferring the discrete article includes:
      bringing the discrete article retained on the article carrying surface into contact with the receiving surface at the article placement location; and applying a pushing force from the transfer puck onto the receiving surface as the discrete article is brought into contact with the article carrying surface to transfer the discrete article from the article carrying surface onto the receiving surface;

wherein the pushing force causes the one or more puck inserts to depress inwardly toward the article carrying surface.

22. A method according to claim 21, wherein the pushing force depresses a puck insert of the one or more puck inserts positioned at a leading edge of the transfer puck that first comes into contact with the receiving surface at the article placement location.

23. A method according to claim 22, wherein the pushing force depresses a puck insert of the one or more puck inserts positioned at a trailing edge of the transfer puck opposite the leading edge.

24. A method according to claim 21, wherein the vacuum communicated through the transfer puck is communicated through vacuum holes formed in the article carrying surface and the one or more puck inserts.

\* \* \* \* \*